US012631903B2

(12) United States Patent
Becken et al.

(10) Patent No.: US 12,631,903 B2
(45) Date of Patent: May 19, 2026

(54) METHOD AND DEVICE FOR ACCELERATED CALCULATION OF WAVEFRONTS THROUGH A COMPLEX OPTICAL SYSTEM

(71) Applicant: Rodenstock GmbH, Munich (DE)

(72) Inventors: Wolfgang Becken, Neuried (DE);
Stephan Trumm, Munich (DE);
Patrick Kerner, Oberhaching (DE);
Adam Muschielok, Munich (DE);
Helmut Altheimer, Baisweil-Lauchdorf
(DE); Gregor Esser, Munich (DE);
Dietmar Uttenweiler, Icking (DE)

(73) Assignee: Rodenstock GmbH, Munich (DE)

( * ) Notice: Subject to any disclaimer, the term of this patent is extended or adjusted under 35 U.S.C. 154(b) by 369 days.

(21) Appl. No.: 18/251,563

(22) PCT Filed: Nov. 3, 2021

(86) PCT No.: PCT/EP2021/080438
§ 371 (c)(1),
(2) Date: May 3, 2023

(87) PCT Pub. No.: WO2022/096476
PCT Pub. Date: May 12, 2022

(65) Prior Publication Data
US 2024/0427173 A1     Dec. 26, 2024

(30) Foreign Application Priority Data
Nov. 3, 2020     (DE) .......................... 102020128953.7

(51) Int. Cl.
*G02C 7/02*     (2006.01)

(52) U.S. Cl.
CPC ..................................... *G02C 7/028* (2013.01)

(58) Field of Classification Search
CPC ........ G02C 7/028; G02C 7/022; G02C 7/061; G02C 2202/22
See application file for complete search history.

(56) References Cited

U.S. PATENT DOCUMENTS 6,089,711 A     7/2000 Blankenbecler et al.
8,757,800 B2 *  6/2014 Esser ..................... G02C 7/061
                                      351/159.76
(Continued)

FOREIGN PATENT DOCUMENTS

DE     102011101923 A1    11/2012
JP       2020506411 A     2/2020

OTHER PUBLICATIONS

Beeck, A. et al., "Particle Swarm Optimization for Wavefront Correction in Ophthalmic Applications", Journal of Physics: Photonics, Bd. 2, Nr. 4, 25 pgs., Aug. 19, 2020.
(Continued)

*Primary Examiner* — Tuyen Tra
(74) *Attorney, Agent, or Firm* — Banner & Witcoff, Ltd.

(57)     ABSTRACT

Simulating an optical system by calculating wavefronts. The method includes: setting up at least one wavefront transfer function for the optical system, wherein the wavefront transfer function is designed to assign a respective associated emergent wavefront to wavefronts entering into the optical system, taking into account imaging errors with an order greater than the order of defocus; and evaluating the at least one wavefront transfer function for at least one wavefront entering into the optical system.

26 Claims, 5 Drawing Sheets

(56)         References Cited

U.S. PATENT DOCUMENTS

2010/0145489 A1     6/2010  Esser et al.
2015/0002810 A1     1/2015  Altheimer et al.
2018/0210228 A1     7/2018  Trumm et al.

OTHER PUBLICATIONS

Mar. 1, 2022 (PCT) International Search Report and Written Opinion—
App. PCT/EP2021/080438.
Jan. 28, 2025 (DE) Office Action—App. 102020008145.2.
Sep. 19, 2025 (JP) Office Action—App. 2023527099.

* cited by examiner

METHOD AND DEVICE FOR ACCELERATED CALCULATION OF WAVEFRONTS THROUGH A COMPLEX OPTICAL SYSTEM

TECHNICAL FIELD

The present invention relates to a method, a computer program product, and a device for simulating an optical system by means of a calculating wavefronts. In particular, the invention relates to a method, a computer program product, and a device for calculating and/or optimizing, as well as producing, a spectacle lens.

BACKGROUND

For the production or optimization of spectacle lenses, in particular of individual spectacle lenses, each spectacle lens is manufactured so that an optimally good correction of a refraction error of the respective eye of the spectacle lens is achieved. In general, a spectacle lens is fully corrective for a given viewing direction when the values for sphere, cylinder, and axis of the wavefront upon passing the vertex sphere coincide with the values for sphere, cylinder, and axis of the prescription for the ametropic eye. In determining refraction for an eye of a spectacles wearer, dioptric values (in particular sphere, cylinder, axis positioning-thus in particular sphero-cylindrical deviations) for a far (typically infinite) distance and, if applicable (for multifocal or vari-focal lenses), an addition or a complete near refraction for a close distance (for example according to DIN 58208) are determined. For modern spectacle lenses, non-standard objective distances that were used in the refraction determination can also be additionally specified. The prescription (in particular sphere, cylinder, axis positioning, and if applicable addition or near refraction) is therewith established, which prescription is communicated to a spectacle lens manufacturer. Knowledge of a specific or individual anatomy of the respective eye, or the actual refractive indices of the ametropic eye that are present in the individual case, are therefore unnecessary.

However, a complete correction for all viewing directions is not possible under normal circumstances. Therefore, the spectacle lenses are manufactured such that they produce a good correction of ametropias of the eye and only slight imaging errors primarily in the main usage regions, in particular in the central viewing directions, whereas greater imaging errors are allowed in peripheral regions.

In order to be able to manufacture a spectacle lens, a calculation of the spectacle lens surfaces, or at least of one of the spectacle lens surfaces, initially takes place such that the desired distribution of the unavoidable imaging errors is thereby produced. This calculation and optimization typically takes place via minimization of a target function by means of an iterative variation method. In particular, a function F with the following functional correlation with the spherical effect S, with the magnitude of the cylindrical effect z, and with the axis position of the cylinder a (also referred to as an "SZA" combination) is considered as a target function and minimized:

$$F = \sum_{i=1}^{m} \left[ g_{i,S\Delta}(S_{\Delta,i} - s_{\Delta,i,Target})^2 + g_{i,Z\Delta}(Z_{\Delta,i} - Z_{\Delta,i,Target})^2 + \dots \right]$$

In the target function F, at least the actual refraction deficits of the spherical effect $S_{\Delta,i}$ and of the cylindrical effect $Z_{\Delta,i}$, as well as target specifications for the refraction deficits of the spherical effect $S_{\Delta,i,Target}$ and of the cylindrical effect $Z_{\Delta,i,Target}$, are thereby taken into account at the evaluation points i of the spectacle lens.

In DE 103 13 275, it was already recognized that it is advantageous to specify the target specifications not as absolute values of the properties to be optimized, but rather as their deviations from the prescription, thus as a stipulated local maladjustment. As "real" values of the properties to be optimized, it is thus not absolute values of these optical properties that enter into the target function but rather the deviations from the prescription. This has the advantage that the target specifications are independent of the prescription (in particular $Sph_V,Cyl_V,Axis_V,Pr_V,B_V$), and the target specifications do not need to be modified for every individual prescription.

The respective refraction deficits at the respective evaluation points are preferably taken into account with weighting factors $g_{i,S\Delta}$ or $g_{i,Z\Delta}$. The target specifications for the refraction deficits of the spherical effect $S_{\Delta,i,Target}$ and/or of the cylindrical effect $Z_{\Delta,i,Target}$, in particular together with the weighting factors $g_{i,S\Delta}$ or $g_{i,Z\Delta}$, thereby form what is known as the spectacle lens design. Moreover, in particular additional residuals, in particular additional variables to be optimized such as, for example, coma and/or spherical aberration and/or prism and/or magnification and/or anamorphotic distortion etc., can also be taken into account, which is indicated in particular by the expression "+ . . . " in the aforementioned formula for the target function F.

In some instances, it may contribute to a marked improvement, in particular of an individual adaptation of a spectacle lens, if not only imaging errors up to the second order (sphere, magnitude of the astigmatism, and axis position) but rather also higher-order errors (for example coma, trefoil errors, spherical aberration etc.) are taken into account in the optimization of the spectacle lens.

From the prior art, it is known to determine the shape of a wavefront for optical elements, and in particular for spectacle lenses that are bounded by at least two refringent refractive interfaces. For example, this can take place via numerical calculation of a sufficient number of neighboring rays, linked with a subsequent fit of the wavefront via Zernike polynomials. Another approach is based on a local calculation of wavefronts in the refraction (see WO 2008/089999 A1). Only a single ray (the principal ray) is hereby calculated per visual point, and concomitantly the derivatives of the vertex depths of the wavefront according to the transversal (orthogonal to the principal ray) coordinates. These derivatives can be calculated up to a defined order, wherein the second derivatives describe the local curvature properties of the wavefront (for example index of refraction, astigmatism) and the higher derivatives coincide with the higher-order imaging errors.

In calculating light through a spectacle lens, the local derivatives of the wavefronts are calculated at a suitable position in the ray path in order to compare them there with desired values that emerge from the refraction of the spectacles wearer. The vertex sphere or, for example, the principal plane of the eye at the corresponding viewing direction can be used as such a position at which an evaluation of the wavefronts occurs. Alternatively or additionally, for example, the entrance pupil EP, the exit pupil AP, and/or preferably the plane after the refraction, at the rear surface L2 of the eye lens, can be used for the evaluation of the wavefronts. It is thereby assumed that a spherical wavefront emanates from the object point and propagates up to the first spectacle lens surface. There, the wavefront is refracted and subsequently propagates to the second spectacle lens surface, where it is refracted again. The last propagation then occurs from the second interface up to the vertex sphere (or the principal plane of the eye), where the wavefront is compared with predetermined values for the correction of the refraction of the eye of the spectacles wearer.

In order to perform this comparison on the basis of the determined refraction data of the respective eye, the evaluation of the wavefront at the vertex sphere assumes an established model of the ametropic eye in which an ametropia (refraction deficit) is superimposed on an emmetropic basic eye. This has especially proven itself since advanced knowledge in this regard about the anatomy or optics of the respective eye (for example distribution of the indices of refraction, eye length, length ametropia, and/or refractive index ametropia) is not required. Detailed descriptions of this model of spectacle lens and refraction deficit are contained in, for example, Dr. Roland Enders, "Die Optik des Auges und der Sehhilfen," Optische Fachveröffentlichung GmbH, Heidelberg, 1995, pages 25 ff., and in Diepes, Blendowske "Optik und Technik der Brille," Optische Fachveröffentlichung GmbH, Heidelberg, 2002, pages 47 ff. In particular, the correction model described therein according to REINER is used as a proven model.

The lack or the excess of refractive index of the optical system of the ametropic eye, in comparison to an equally long emmetropic eye (remaining eye), is thereby considered a refraction deficit. The refractive index of the refraction deficit is in particular approximately equal to the far point refraction with negative sign. For a complete correction of the ametropia, the spectacle lens and the refraction deficit together form a telescopic system (afocal system). The remaining eye (ametropic eye without introduced refraction deficit) is assumed to be emmetropic. A spectacle lens is therefore considered to be fully corrective for distance when its image-side focal point coincides with the far point of the ametropic eye, and therefore also with the object-side focal point of the refraction deficit.

In the publication DE 10 2017 007 975 A1 or, respectively, WO 2018/138140 A2, a method and a device are described that allow the calculation or optimization of a spectacle lens to be improved, wherein the spectacle lens is already adapted very effectively to the individual requirements of the spectacles wearer with simple measurements of individual, optical, and eye-anatomical data.

According to the prior art, a spectacle lens optimization can also be executed in that a target function that assesses the wavefront aberration within an eye model is minimized. The wavefront aberration is thereby crated by comparison of a reference wavefront with a wavefront that is determined by means of calculating a wavefront through the refracting components of an eye model. Each wavefront must hereby be alternately refracted and propagated. This procedure is based on the publications of G. Esser, W. Becken, W. Müller, P. Baumbach, J. Arasa, D. Uttenweiler: "Derivation of the refractive equations for higher order aberrations of local wavefronts by oblique incidence," J. Opt. Soc. Am. A 27, 218-237 (2010) and G. Esser, W. Becken, W. Müller, P. Baumbach, J. Arasa, D. Uttenweiler: "Derivation of the propagation equations for higher order aberrations of local wavefronts," J. Opt. Soc. Am. A 28, 2442-2458 (2011), and is described in particular in the patent documents DE 10 2012 000 390 A1, U.S. Pat. No. 9,910,294 B2, DE 10 2011 101 923 A1, and WO 2008/089999 A1. The aforementioned publications are explicitly referenced herein, and their contents are incorporated in their entire scope into the present specification.

It is also known that, as an alternative to the wavefront calculation, the wavefront aberrations can be assessed by means of a pencil of rays. The path of every single light ray of the pencil through the spectacle lens and the eye model must thereby be calculated, which requires greater computation times in comparison to the wavefront calculation.

Even if, according to the prior art, efficient methods are already available for the individual calculation steps of the refraction and propagation of wavefronts, unacceptably long computation times arise due to the number of refractions and propagations, especially if new wavefronts must be calculated again and again through one and the same eye model. A repeated calculation of wavefronts is necessary, for example, in the event of a spectacle lens optimization based on the iterative steps for optimization. Furthermore, changing viewing directions and/or object distances can occur in the spectacle lens optimization, which can likewise require a repeated calculation of wavefronts.

In order to optimize an optical system per simulation, the passage of light through the system must be physically described and then be assessed according to suitable criteria. What is understood by an optimization is a targeted modification of the system such that the light passing through comes as close as possible to a set target with regard to the criteria. As an example, the light passing through can be described by a scalar or a vectorial electromagnetic field. Furthermore, there is the possibility to define in this field the surfaces of the same phase as wavefronts, and to use these as a basis for assessment.

If interference effects due to the final wavelength of light are ignored, the light passage can instead be described with wave optics and with geometric optics. According to the prior art, in geometric optics there are methods for calculating rays (ray tracing). A simple condition under which ray tracing can be implemented is paraxial. An especially simple form is hereby in turn Gaussian optics, in which all rays remain in a meridian. The description then relates only to the optics within the one meridian (given rotationally symmetrical systems in which every meridian is equivalent, the entire system can then be described representatively in the one meridian). A more general form that is suitable for two independent meridians is linear optics. In both Gaussian optics and linear optics, each system is defined in that there is an entrance plane, orthogonal to the light propagation of the principal ray, and an additional exit plane parallel thereto. The optical system is thereby characterized by how the coordinates and directions of an exiting ray depend on the corresponding variables of the entering ray, wherein this dependency is linear in the paraxial region.

As an alternative to ray tracing, there is also an equivalent—in terms of content—calculation of wavefronts (wave tracing) that, in geometric optics, are defined as the spatial surfaces through which each ray of a pencil passes orthogonally. There are equivalent reformulations of wavefronts in geometric optics. For example, in Fourier optics, it is not spatial surfaces that are used, but rather instead planes orthogonal to the light propagation of the principal ray, and the OPD (Optical Path Difference) that separates every point of the plane from a predetermined reference point is described as a function of the lateral coordinates of this plane.

Wavefronts, or else the equivalent OPD functions, can be described in various ways. For example, these functions can be described by freeform surfaces, for instance with B-splines. In the event that a section of the wavefront that is demarcated by a pupil is relevant, wavefronts are described via composition from a sufficient number of Zernike polynomials (see for example Born and Wolf: "Principles of Optics," Oxford, Pergamon, 1970) which are weighted with the corresponding Zernike coefficients. A typical local description for the environment of the principal ray in turn exists in the Taylor series expansion, thus local derivatives of the wavefront according to the lateral coordinates that represent weightings with which powers of the coordinates are linearly combined into a wavefront.

In particular, it is prior art to optimize spectacle lenses in that wavefronts through spectacle lenses are calculated per wave tracing, and afterward are compared with defined specifications in order to assess a target function (see, for example, WO 2008/089999 A1). This target function can be constructed so that its minimization leads to an improvement of the spectacle lens.

In one embodiment of the prior art, exclusively second-order wavefront errors (LOA, Lower Order Aberration) are used for the wavefronts. In a further embodiment of the prior art, both second-order wavefront errors (LOA) and third-order or higher-order wavefront errors (HOA, Higher Order Aberration) are used. To calculate wavefronts that are afflicted with such HOAs, in the prior art there are methods for both refraction (see G. Esser, W. Becken, W. Müller, P. Baumbach, J. Arasa, D. Uttenweiler: "Derivation of the refractive equations for higher order aberrations of local wavefronts by oblique incidence," J. Opt. Soc. Am. A 27, 218-237 (2010), as well as WO 2008/089999 A1) and propagation (see G. Esser, W. Becken, W. Müller, P. Baumbach, J. Arasa, D. Uttenweiler: "Derivation of the propagation equations for higher order aberrations of local wavefronts," J. Opt. Soc. Am. A 28, 2442-2458 (2011), as well as DE 10 2011 101 923 A1). The great technical advantage of these methods is that they are based on analytical formulas, and therefore are not reliant upon the computationally intensive numerics of ray tracing methods.

Furthermore, the prior art discloses methods according to which wavefronts are only calculated through the spectacle lens itself for optimization of said spectacle lens (see DE 10 2011 101 923 A1), as well as methods according to which wavefronts are calculated both through the lens to be optimized and through an eye model (see DE 10 2012 000 390 A1, U.S. Pat. No. 9,910,294 B2, DE 10 2017 007 975 B4).

However, the prior art has, as of yet, not offered a method as to how light, in the form of a wavefront including HOAs, can be generally calculated analytically through a complex optical system, such that it is again necessary to resort to computationally intensive ray tracing methods, or to a repeatedly applied calculation of the individual components by means of wave tracing (which is likewise computationally intensive), for such a system.

SUMMARY

It is therefore an object of the present invention to provide a method for accelerated wavefront calculation through a complex optical system. In particular, it is an object of the present invention to provide an efficient method for calculation and/or optimization of a spectacle lens, as well as for production of a spectacle lens. Moreover, it is an object of the present invention to provide a computer program product in this regard and a device in this regard. These objects are achieved by the subject matters of the parallel claims. Advantageous embodiments are the subject matter of the dependent claims.

A first independent aspect for achieving the object relates to a method, in particular a computer-implemented method, for simulation of an optical system by means of a wavefront calculation, wherein the optical system is in particular a complex optical system whose effect exceeds a single refraction, a single propagation, or a single reflection, comprising the steps:

setting up a wavefront transfer function for the optical system, wherein the wavefront transfer function is designed to assign a respective associated emergent wavefront to wavefronts entering the optical system, taking into account imaging errors with an order greater than the order of defocus; and evaluating the at least one wavefront transfer function for at least one wavefront entering into the optical system.

A "complex optical system" in the sense of this invention is in particular an optical system whose effect on an arbitrary wavefront, or alternatively on an arbitrary light ray pencil, can be described neither by a refraction or reflection at a single surface nor by a single propagation between two different planes. Rather, a complex optical system comprises a plurality of components that, upon traversal by light or a wave or wavefront, leads to at least two refractions, and/or to at least two propagations, and/or to at least one refraction and at least one propagation.

The term "setting up a function" comprises, in the sense of the invention, an establishing and/or defining of a function. The setting up of a function can thereby take place manually (i.e. in particular by a user of the method) or automatically or as implemented by a computer, with the aid of a processor or computer. In particular, the setting up of the at least one wavefront transfer function comprises a population of coefficients of the at least one wavefront transfer function. The setting up of at least one wavefront transfer function can comprise the setting up of only a single wavefront transfer function or the setting up of a plurality of, in particular two or three, wavefront transfer functions. For example, a plurality of (i.e. two, three, four, five etc.) wavefront transfer functions can be set up for a plurality of different configurations of the optical system. Different configurations of an optical system can thereby generally comprise different parameters that characterize or describe the optical system. In particular, different configurations of an optical system can also comprise different positions and/or orientations of components of the optical system with respect to one another, and/or different positions and/or orientations of the optical system (for example relative to another optical system). In particular, all set-up wavefront transfer functions can thus differ from one another.

What is meant by the term "evaluation" of the at least one wavefront transfer function for an incident wavefront is in particular that the at least one wavefront transfer function is applied to an incident wavefront. In other words, an associated emergent or exiting wavefront is associated, by the "evaluation" of the at least one wavefront transfer function, with a predetermined wavefront entering (into the optical system).

The at least one wavefront transfer function is designed or defined in order to assign a respective associated emergent or exiting wavefront to wavefronts entering into the optical system, taking into account imaging errors of an order greater than the order of defocus. In particular, the at least one wavefront transfer function is intended to generally describe a change of wavefronts entering into the optical system, under consideration of imaging errors with an order greater than the order which corresponds to a defocus. In particular, the at least one wavefront transfer function is designed and/or defined in order to transform the at least one incident wavefront into an associated emergent or exiting wavefront. In particular, the wavefront transfer function is intended to assign an associated emergent or exiting wavefront to each wavefront entering into the optical system. The at least one wavefront transfer function thereby also takes into account imaging errors or a component that exceed(s) a defocus and an astigmatism (corresponding to the "order" of a defocus), thus—depending on the presentation—in particular exceed(s) a sphere and a cylinder (including axis position). In a description of the imaging errors according to Zernike (i.e., using Zernike polynomials) and/or in a description of the imaging errors with the aid of a Taylor expansion, this means in particular that the at least one wavefront transfer function takes into account imaging errors of an order greater than two, i.e. higher order aberrations (HOAs) or, respectively, higher-order imaging errors. In particular, the at least one wavefront transfer function thus takes into account not only imaging errors up to the second order (sphere, magnitude of the astigmatism, and axis position), but rather also higher-order imaging errors such as, for example, spherical aberration, coma, trefoil error etc.

The invention this relates in particular to a method for simulating an optical system, wherein a method for calculating wavefronts is used that comprises the following steps:

setting up a wavefront transfer function for the optical system;

evaluating the wavefront transfer function for a first wavefront entering into the optical system;

evaluating the wavefront transfer function for a second wavefront entering into the optical system, which second wavefront differs from the first wavefront;

wherein the wavefront transfer function transforms the incident wavefront into an emergent wavefront, and generally describes the change of incident wavefronts by the optical system, and thereby takes into account at least one component whose order exceeds the order of defocus component, and wherein the effect of the optical system exceeds that of a single refraction, a single propagation, or a single reflection.

According to the invention, it has been recognized that, for a conventional step-by-step wavefront calculation, the same intermediate steps are repeatedly run through again and again unnecessarily often. In all instances in which only the wavefront emergent at the last surface of an optical system (for example, of an eye model) is of interest, the explicit calculation of all wavefronts at the intermediate surfaces is superfluous and can be spared.

The present invention therefore breaks with the procedure known from the prior art, and instead proposes a method with which an incident wavefront can be transformed into an emergent wavefront with a single operation. In particular, corresponding transfer functions for every optical system can be set up or defined from arbitrarily many refractive surfaces and propagations if the parameters of such a complex system are present. The complex optical system, for example in the event of a "Gradient Index" object (GRIN object), thereby does not even need to be reducible to a finite number of pure refractions and/or propagations at all. Instead of this, a specification of the optical system by the ray transfer function, which uniquely associates an emergent ray with each incident ray, is sufficient. The steps to construct this transfer function might be complicated, but they only need to be executed a single time. It is decisive that the computation cost of the evaluation of the transfer function must be less than the computation cost of the evaluation of the individual sub-steps of the propagation and refraction in a complex optical system.

The prior art has, until now, not offered any method as to how light in the form of a wavefront, including the HOAs, can be generally analytically calculated through a complex optical system, such that computationally intensive ray tracing methods or time-intensive repeated application of a wave tracing calculation of the individual components must be resorted to again for such a system. However, the present invention solves this problem by means of an analytical and very computation time-saving method. The technical advantage of the invention is in particular that a high number of different wavefronts through a given complex optical system can be calculated very efficiently, in that it is utilized that the optical system itself does not thereby change, and the calculation step for setting up a wavefront transfer function must be executed only a single time in advance.

In a preferred embodiment, the invention relates to a method, in particular a computer-implemented method, for optimizing a total optical system, wherein the optical system represents a second partial system of the total optical system, and the total optical system additionally comprises a first partial system. The first partial system and/or the second partial system can in particular be varied in the course of the optimization. What is understood by "optimization" in the sense of the present invention is in particular the calculation and/or optimization of a spectacle lens (to be produced) for correction of an ametropia of a spectacles wearer.

In a further preferred embodiment, the first partial system is a spectacle lens and the second partial system is a model eye.

A "model eye" in the sense of the present invention is in particular a data set with eye model parameters which describe a real eye. The model eye preferably also has provided (in particular measured) individual refraction data of a spectacles wearer. The eye model parameters can also be measured at least in part.

In particular, the method can comprise an establishing of an individual eye model which individually establishes at least certain specifications about geometric and optical properties of a model eye. In an individual eye model, for example, at least one shape (topography) and/or effect of the cornea, in particular an anterior corneal surface, of the model eye; a cornea-lens distance dcl (this distance between the cornea and an anterior lens surface of the model eye is also referred to as an anterior chamber depth); parameters of the lens of the model eye which in particular at least partially establish the optical effect of the lens of the model eye; and a lens-retina distance $d_{LR}$ (this distance between the lens, in particular the posterior lens surface, and the retina of the model eye is also referred to as a vitreous body length) can be established in a defined manner, in particular such that the model eye has the provided individual refraction data, i.e. such that a wavefront exiting from a point of the retina of the model eye in said model eye coincides with the wavefront determined (for example measured or otherwise determined) for the real eye of the spectacles wearer (up to a desired precision). As parameters of the lens of the model eye (lens parameters), for example, either geometric parameters (shape of the lens surfaces and their distance) and preferably material parameters (for example indices of refraction of the individual components of the model eye) can be so completely established that these at least partially establish an optical effect of the lens. Alternatively or additionally, for the model eye, lens parameters may also be established that directly describe the optical effect of the lens of the model eye. With regard to the cornea, at most the shape of the anterior corneal surface is measured; however, alternatively or additionally the effect of the cornea as a whole (no differentiation between anterior and posterior surface) can also be specified. A posterior corneal surface and/or a cornea thickness can possibly also be specified. If individual intraocular lens data are also known or these are provided, the establishing of the parameters of the lens of the model eye may also take place using the provided intraocular lens data.

In the simplest instance of an eye model, the refraction of the eye is determined by the optical system consisting of the anterior corneal surface, the eye lens, and the retina. In this simple model, the light refraction at the anterior corneal surface and the refractive power of the eye lens (preferably including the spherical and astigmatic aberrations and higher-order aberrations), together with their positioning relative to the retina, establish the refraction of the model eye. The individual variables (parameters) of the model eye are thereby accordingly established using individual measurement values for the eye of the spectacles wearer and/or using standard values and/or using provided individual refraction data. In particular, some of the parameters (for example the topography of the anterior corneal surface and/or the anterior chamber depth and/or at least one curvature of a lens surface etc.) can be directly provided as individual measurement values. Other values can also be adapted from values of standard models for a human eye—in particular when these are parameters whose individual measurement is very complicated. Overall, however, not all (geometric) parameters of the model eye must be predetermined from individual measurements or from standard models. Rather, an individual adaptation via calculation or consideration of the predetermined parameters may be performed for one or more (free) parameters, such that the model eye that then results has the provided individual refraction data. Depending on the number of parameters contained in the provided individual refraction data, accordingly many (free) parameters of the eye model can be individually adapted (fitted).

For the calculation or optimization of the spectacle lens, a first surface and a second surface of the spectacle lens can in particular be predetermined as starting surfaces with a predetermined (individual) position relative to the model eye. In a preferred embodiment, only one of the two surfaces is optimized. It is hereby preferably the posterior surface of the spectacle lens. A corresponding starting surface is thereby preferably predetermined both for the anterior surface and for the posterior surface of the spectacle lens. In a preferred embodiment, however, only one surface is iteratively modified or optimized during the optimization method. The other surface of the spectacle lens can be, for example, a simple spherical or rotationally symmetric aspherical surface. However, it is also possible to optimize both surfaces.

Starting from the two predetermined surfaces, the method for calculating or optimizing can comprise a determination of the curve of a principal ray through at least one visual point (i) of at least one to-be-calculated or to-be-optimized surface of the spectacle lens in the model eye. The principal ray describes the geometric ray path starting from an object point, through the two spectacle lens surfaces, the anterior corneal surface, and the lens of the model eye, preferably up to the retina of the model eye.

Moreover, the method for calculating and optimizing can comprise an evaluation of an aberration of a wavefront, said wavefront resulting along the principal ray from a spherical wavefront incident on the first surface of the spectacle lens, at an evaluation surface within the model eye, in comparison to a wavefront (reference light) converging at a point on the retina of the eye model. In particular, for this purpose a spherical wavefront ($w_0$) incident on the first surface (anterior surface) of the spectacle lens along the principal ray can be provided. This spherical wavefront describes the light (object light) emanating from an object point. The curvature of the spherical wavefront upon striking the first surface of the spectacle lens corresponds to the reciprocal of the object distance. The method thus preferably comprises a predetermination of an object distance model which associates an object distance with each viewing direction or each visual point of the at least one to-be-optimized surface of the spectacle lens. The individual usage situation in which the spectacle lens should be used is therewith preferably described.

The wavefront incident on the spectacle lens is now preferably refracted for the first time at the anterior surface of the spectacle lens. The wavefront subsequently propagates along the principal ray within the spectacle lens, from the anterior surface to the posterior surface, where it is refracted for a second time. The wavefront transmitted through the spectacle lens now preferably propagates further along the principal ray up to the anterior corneal surface of the eye, where it is preferably refracted again. After a further propagation within the eye, up to the eye lens, the wavefront is preferably also refracted there again, in order to finally propagate preferably up to the retina of the eye. Depending on optical properties of the individual optical elements (spectacle lens surfaces, anterior corneal surface, eye lens), each refraction process and each propagation process also leads to a deformation of the wavefront.

In order to achieve an exact mapping of the object point to an image point on the retina, the wavefront would need to leave the eye lens preferably as a converging spherical wavefront whose curvature corresponds precisely to the reciprocal of the distance to the retina. A comparison of the wavefront emanating from the object point with a wavefront (reference light) converging (with perfect mapping in the ideal case) at a point on the retina thus allows the evaluation of a maladaptation. This comparison, and therewith the evaluation of the wavefront of the object light in the individual eye model, can thereby take place at different points along the path of the principal ray, in particular between the second surface of the spectacle lens to be optimized and the retina. In particular, the evaluation surface can therewith be situated at different positions, in particular between the second surface of the spectacle lens and the retina. The refraction and propagation of the light emanating from the object point are calculated at a corresponding distance in the individual eye model, preferably for each visual point. The evaluation surface can relate either to the actual ray path or to a virtual ray path as it is utilized for, for example, construction of the exit pupil AP. In the event of a virtual ray path, the light must be propagated back through the posterior surface of the eye lens after the refraction, up to a desired plane (preferably up to the plane of the AP), wherein the index of refraction that is thereby utilized must correspond to the medium of the vitreous body and not, for instance, to the eye lens. In the event that the evaluation surface is provided behind the lens or after the refraction at the posterior lens surface of the model eye, or, in the event that the evaluation surface is achieved via back-propagation along a virtual ray path (as in the instance of the AP), the resulting wavefront of the object light can then preferably simply be compared with a spherical wavefront of the reference light. For this, the method thus preferably comprises a predetermination of a spherical wavefront incident on the first surface of the spectacle lens; a determination of a wavefront resulting in the at least one eye from the spherical wavefront due to the effect of at least the first and second surface of the spectacle lens, the anterior corneal surface, and the lens of the model eye; and an evaluation of the aberration of the resulting wavefront in comparison to a spherical wavefront converging on the retina. By contrast, in the event that an evaluation surface should be provided within the lens or between the lens of the model eye and the spectacle lens to be calculated or optimized, a reversed propagation from a point on the retina, through the individual components of the model eye, up to the evaluation surface is simply simulated as a reference light, in order to perform a comparison there of the object light with the reference light.

However, as was already mentioned above, a complete correction of the refraction of the eye simultaneously for all viewing directions of the eye, thus for all visual points of the at least one spectacle lens surface to be optimized, is generally not possible. Depending on the viewing direction, a deliberate maladaptation of the spectacle lens is thus predetermined which, depending on the use situation, is slight in the primarily used regions of the spectacle lens (for example central visual points), somewhat greater in the less used regions (for example peripheral visual points). This procedure is already known in principle from conventional optimization methods.

In a further preferred embodiment, the at least one wavefront entering into the optical system is determined on the basis of a predetermined test wavefront which traverses the first partial system.

In a further preferred embodiment, the method also comprises the step of:

assessing the total optical system on the basis of the result of the evaluation of the at least one wavefront transfer function for the at least one wavefront entering into the optical system, wherein the total optical system is assessed under variation of the first partial system until the assessment satisfies a predetermined condition.

What is understood by "assessment" of a system in the sense of this specification is especially an assessment of the system with the aid of a functional or a target function. In particular, the assessment of a system can comprise a minimization of a functional or of a target function, for example by means of an iterative variation method. In the instance of a spectacle lens optimization, for example, the aforementioned function $F=\Sigma_{i=1}^{m}[g_{i,S\Delta}(S_{\Delta,i}-S_{\Delta,i,Target})^2+ g_{i,Z\Delta}(Z_{\Delta,i}-Z_{\Delta,i,Target})^2+ \ldots]$ can be used as a target function. Since the minimization of a target function as well as iterative variation methods used for this are well known to the person skilled in the art, this is not discussed in further detail within the scope of this invention. The predetermined condition for the assessment can in particular be a predetermined threshold of the target function. If, in a defined variation or configuration of the first partial system, the target function falls below this threshold, the target—namely to optimize the total system—is thus achieved. A further variation and/or a further assessment is then no longer necessary.

In particular, the variation of the first partial system comprises a changing of at least one refracting surface and/or of at least one distance between refracting surfaces of the first partial system, and/or a tilting and/or displacement of the first partial system relative to the second partial system. In the event that the first partial system is a spectacle lens, a variation of the first partial system or spectacle lens can, for example, comprise a modification of the shape of at least one spectacle lens surface (anterior and/or posterior surface).

According to a preferred embodiment, the invention according thus in particular comprises a method for optimizing a total optical system, wherein the optical system represents a second partial system of the total optical system, and the total optical system additionally comprises a first partial system which can be varied in the course of the optimization, and wherein the wavefront entering into the optical system is determined by the passage of a test wavefront through the first partial system, and the total optical system is assessed on the basis of the result of the evaluation of the wavefront transfer function for the wavefront entering into the optical system, and in which the first partial system is varied, and the total optical system is assessed, until the evaluation satisfies a predetermined condition.

If the first partial system is a spectacle lens, as an example the at least one to-be-calculated or to-be-optimized surface of the spectacle lens can thus be iteratively varied, in order to optimize the spectacle lens, until an aberration of the resulting wavefront corresponds to a predetermined desired aberration, thus in particular deviates by predetermined values of the aberration from the wavefront of the reference light (for example a spherical wavefront whose center of curvature is situated on the retina). Here the wavefront of the reference light is also referred to as a reference wavefront. For this purpose, the method preferably comprises a minimization of a target function F, in particular analogous to the target function already described above.

In a further preferred embodiment, the assessment of the total optical system is performed on the basis of the result of the evaluation of the at least one wavefront transfer function for a first wavefront entering into the optical system, and also on the basis of the result of the evaluation of the at least one wavefront transfer function for a second incident wavefront, wherein the first partial system is located at a first position and orientation relative to the second partial system upon incidence of the first wavefront; wherein the first partial system is located at a second position and orientation relative to the second partial system upon incidence of the second wavefront; and wherein the first position differs from the second position and/or the second orientation differs from the second orientation. Different visual points can be taken into account or evaluated with this procedure, for example.

In particular, according to a preferred embodiment the invention thus pertains to a method for optimizing a total optical system, wherein the assessment of the total optical system comprises—in addition to the result of the evaluation of the wavefront transfer function for the wavefront entering into the optical system—the result of an additional evaluation of the wavefront transfer function for an additional incident wavefront, wherein the additional wavefront entering into the optical system is determined by the passage of the test wavefront through the first partial system, wherein the first partial system is located at a second position and an orientation relative to the second partial system that differs from the position and/or the first orientation [sic] from the second position or orientation in the evaluation of the wavefront transfer function for the incident wavefront.

In particular, according to a further preferred embodiment the invention thus relates to a method for optimizing a total optical system, wherein the optical system represents a second partial system of the total optical system, and the total optical system additionally comprises a first partial system which can be varied in the course of the optimization, wherein the first wavefront entering into the optical system is determined by the passage of a test wavefront through the first partial system, wherein the first partial system is in a first configuration, and the total optical system is assessed on the basis of the result of the evaluation of the wavefront transfer function for the first wavefront entering into the optical system, and wherein the second wavefront entering into the optical system is determined by the passage of a test wavefront through the first partial system, wherein the first partial system is in a first configuration, and the total optical system is assessed on the basis of the result of the evaluation of the wavefront transfer function for the second wavefront entering into the optical system.

In particular, in the method, additional further variations of the first partial system and assessments of the total optical system may be performed until the assessment satisfies a predetermined condition.

In particular, the invention may relate to a method for optimizing a total optical system, wherein the optical system represents a second partial system of the total optical system, and the total optical system additionally comprises a first partial system which can be varied in the course of the optimization, wherein the first wavefront entering into the optical system is determined by the passage of a test wavefront through the first partial system, wherein the first partial system is in a first position and a first orientation relative to the second partial system, and wherein the second wavefront entering into the optical system is determined by the passage of a test wavefront through the first partial system, wherein the first partial system is in a first position and a first orientation relative to the second partial system, wherein the first position and/or the first orientation differ from the second position or orientation, and wherein the assessment of the total optical system comprises the result of the evaluation of the wavefront transfer function for the first wavefront entering into the optical system and the result of the evaluation of the wavefront transfer function for the second wavefront entering into the optical system.

In particular, the assessment of the total optical system comprises a first assessment on the basis of the result of the evaluation of the at least one wavefront transfer function for a first wavefront entering into the optical system, wherein the first partial system is in a first configuration upon incidence of the first wavefront in the optical system, wherein the assessment of the total optical system comprises a second assessment on the basis of the result of the evaluation of the at least one wavefront transfer function for a second wavefront entering into the optical system, wherein the first partial system is in a second configuration upon incidence of the second wavefront in the optical system, which second configuration is established on the basis of the first assessment, and wherein preferably one or more further variations of the configuration of the first partial system are additionally performed on the basis of the second assessment, and the total optical system is assessed for each of these further configurations of the first partial system until the assessment satisfies a predetermined condition, wherein the different configurations of the first partial system differ in particular in at least one refracting surface and/or at least one distance between refracting surfaces of the first partial system, and/or in a position and/or orientation of the first partial system relative to the second partial system.

In the event that the first partial system is a spectacle lens, a configuration of the first partial system can, for example, be characterized by the shape of at least one spectacle lens surface. A variation of the first partial system or spectacle lens can, for example, comprise a variation of the shape of at least one spectacle lens surface.

In a further preferred embodiment, the assessment of the total optical system is performed on the basis of the result of the evaluation of a first wavefront transfer function for a first wavefront entering into the optical system, and also on the basis of the result of the evaluation of a second wavefront transfer function for a further—in particular second or third—incident wavefront, wherein upon incidence of the first wavefront the first partial system is located at a first position and orientation relative to the second partial system; wherein upon incidence of the further wavefront the first partial system is located at a second position and orientation relative to the second partial system; wherein the first position differs from the second position and/or the first orientation differs from the second orientation; and wherein the second wavefront transfer function differs from the first wavefront transfer function.

In particular, the first wavefront transfer function is set up for a first configuration of the second partial system, and the second wavefront transfer function is set up for a second configuration of the second partial system that differs from the first configuration of the second partial system, wherein the first configuration of the second partial system describes, for example, a first accommodation of the model eye, and the second configuration of the second partial system describes a second accommodation of the eye or of the model eye.

In particular, in a preferred embodiment the invention can thus relate to a method for optimizing a spectacle lens, wherein the assessment of the total optical system comprises, in addition to the result of the evaluation of the wavefront transfer function for the first wavefront entering into the optical system and, if applicable, in addition to the result of the evaluation of the wavefront transfer function for the second wavefront entering into the optical system, the result of the evaluation of a further wavefront transfer function for a third wavefront entering into the optical system, and wherein the third wavefront entering into the optical system is determined by the passage of the test wavefront through the first partial system, wherein the first partial system is located at a further position and a further orientation relative to the second partial system; wherein the first position and/or the first orientation differ from the further position or orientation; and wherein the further wavefront transfer function differs from the wavefront transfer function because the optical system has a different configuration than in the evaluation of the wavefront transfer function in the evaluation for the first wavefront entering into the optical system, and wherein the change of the configuration of the optical system can represent an accommodation of the eye.

This embodiment, in which two configurations of the eye are taken into account, can advantageously be used in particular for the optimization of varifocal lenses.

In a further preferred embodiment, the first partial system is a spectacle lens and the second partial system is a model eye, wherein gaze movements of the model eye that produce a variation in the position of the point at which the principal ray penetrates through the spectacle lens surfaces, and/or a variation of the angle of incidence on a spectacle lens surface, are described as a variation of the position and/or of the orientation of the spectacle lens in the coordinate system of the eye. In particular, various visual points can in this way be taken into account by an eye movement.

In a further preferred embodiment, the optical system is a GRIN system or comprises at least one GRIN element, wherein GRIN is the abbreviation for "Gradient Index."

Preferably, both the incident and the respective associated emergent wavefront are respectively represented by coefficients with regard to basic elements of a (common) basic system. The at least one wavefront transfer function thereby preferably assigns the respective associated emergent wavefront to the incident wavefronts such that it determines, for a basic element (in particular for every basic element) represented in the depiction of an emergent wavefront, the coefficients of the emergent wavefront with regard to this basic element, at least depending on coefficients of the associated incident wavefront with regard to the same basic element.

The basic elements are thereby especially preferably classified according to at least one order parameter, and the at least one wavefront transfer function assigns the respective associated emergent wavefront to the incident wavefronts in particular such that it determines, for a basic element (in particular for every basic element) represented in the depiction of an emergent wavefront, the coefficients with regard to this basic element represented in the depiction of the emergent wavefront, at least depending on those coefficients of the associated incident wavefront with regard to those basic elements whose value for the order parameter corresponds to that value of the order parameter of the respective basic element represented in the depiction of the emergent wavefront.

Moreover, it is preferred in particular if the at least one wavefront transfer function assigns the respective associated emergent wavefront to the incident wavefronts such that it determines, for a basic element (in particular for every basic element) represented in the depiction of an emergent wavefront, the coefficients with regard to this basic element represented in the depiction of the emergent wavefront, depending on coefficients of the associated incident wavefront with regard to a plurality (in particular all) of those basic elements whose value for the order parameter is less than or equal to the value of the order parameter of the respective basic element represented in the depiction of the emergent wavefront. In particular, coefficients of the associated incident wavefront can hereby be taken into account with regard to a plurality of basic elements having different values for their order parameters.

In particular, both every incident wavefront and the respective associated emergent wavefront can be depicted with regard to a basic system, wherein basic elements of every incident wavefront are classified according to at least one order parameter, and wherein the at least one wavefront transfer function is provided for a predetermined value of a first order parameter in that, for every wavefront entering into the optical system, it transforms at least one of the basic elements whose order parameter is less than or equal to the predetermined value into a respective associated basic element of the associated emergent wavefront whose order is less than the predetermined value. In particular, the basic elements for each value of the first order parameter are additionally classified according to at least one second order parameter whose value range depends on the value of the first order parameter.

In particular, in a preferred embodiment both every incident wavefront and the respective associated emergent wavefront are respectively represented by coefficients which are associated with basic elements of a basic system, wherein the basic elements are classified according to at least one order parameter, and wherein the at least one wavefront transfer function is provided in that, for every wavefront entering into the optical system, it transforms at least one coefficient which is associated with a basic element having an order parameter less than or equal to a predetermined value into a coefficient of the emergent wavefront, said coefficient being associated with the same basic element. In particular, for this purpose at least the coefficients with regard to basic elements of the incident wavefront whose order parameters are less than or equal to the predetermined value can be taken into account. In other words, at least the coefficients with regard to basic elements of the incident wavefront whose order parameters are less than or equal to the predetermined value can be transformed into a coefficient of the emergent wavefront whose order parameter is less than or equal to the predetermined value.

In particular, the at least one wavefront transfer function can be provided in that, for every wavefront entering into the optical system, it are transformed [sic] the coefficients with regard to the basic elements whose order parameters are less than or equal to a predetermined value into a coefficient with regard to the basic element of the associated emergent wavefront whose order parameter is equal to the predetermined value. The coefficients of basic elements of the incident wavefront whose order parameter is greater than the predetermined value can thereby also be taken into account.

Given a suitable selection of the basic systems, mixed terms of different order can advantageously be ignored, so that a respective coefficient of the incident wavefront, said coefficient being associated with a basic element of a defined order, can be transformed into a coefficient of the emergent wavefront, said coefficient being associated with the same basic element.

In a further preferred embodiment, the order parameter is a first order parameter, wherein the basic elements of the basic system are additionally classified according to at least one second order parameter whose value range depends on the value of the first order parameter.

The at least one wavefront transfer function can, for example, be provided for a predetermined order p in that it transforms at least one of the aberrations $E_2$, $E_3$, . . . , $E_p$ of the first p orders of each wavefront entering into the optical system into a respective one of the aberrations $E'_2$, $E'_3$, . . . , $E'_p$ of the first p orders of the emergent wavefront. Alternatively, aberrations in three dimensions can also be used, wherein in this event the at least one wavefront transfer function is provided for each predetermined order p in that, for $2 \leq q_x + q_y \leq p$, it transforms the aberrations $E_{q_x,q_y}$ of the first p orders of each two-dimensional wavefront entering into the optical system into at least one of the aberrations $E'_{n_x,n_y}$ of the first p orders of the emergent two-dimensional wavefront, wherein $2 \leq n_x + n_y \leq p$ as well as $q_x, q_y \geq 0$ and $n_x, n_y \geq 0$ apply.

In a further preferred embodiment (two-dimensional instance), the basic system is thus a decomposition for aberrations (or, the basic system is defined or established by a decomposition for aberrations), wherein the order parameter is an order p of the aberrations, wherein the coefficients associated with the basic elements of the basic system are provided in that a p-th order coefficient of the incident wavefront is an aberration $E_p$ of the incident wavefront, and in that a p-th order coefficient of the associated emergent wavefront is an aberration $E'_p$ of the associated emergent wavefront, and wherein $p \geq 2$.

In a further preferred embodiment (three-dimensional instance), the basic system is a decomposition for aberrations (or, the basic system is defined or established by a decomposition for aberrations), wherein the first order parameter is the sum p of orders $p_x$ and $p_y$, wherein the second order parameter is one of the orders $p_x$ and $p_y$, wherein the coefficients associated with the basic elements of the basic system are provided in that p-th order coefficients of the incident wavefront are aberrations $E_{px,py}$ of the incident wavefront, and in that p-th order coefficients of the associated emergent wavefront are aberrations $E'_{px,py}$ of the associated emergent wavefront, and wherein $p \geq 2$ and $p_x \geq 0$ and $p_y \geq 0$.

In a further preferred embodiment, the at least one wavefront transfer function has the formula $$E'_p = \beta^{-\bar{r}_1^0(p-1)} \sum_{k_1, k_2, \ldots, k_{p-1}} \bar{b}_{pk} \beta^{-\Delta \bar{r}_1(p-1,k^*)} E_2^{k_1} E_3^{k_2} \ldots E_p^{k_{p-1}},$$

$$p = 2, 3, 4, \ldots$$

wherein the indices of the tuple $k = (k_1, k_2, \ldots, k_{p-1})$ run over the range $P(k^*) \leq p-2$ and $0 \leq k_1 \leq 2(p - P(k^*) - 2) + \delta_{P(k^*),0}$, wherein $P(k^*) = = \Sigma_{j=1}^{p-2} j k_{j+1}$, and wherein $-\bar{r}_1^0(p-1) = p - \delta_{(p-1),1}$ and $-\Delta \bar{r}_1(p-1,k^*) = (p-3) + \delta_{(p-1),1} - P(k^{**})$ apply, and wherein $\beta = (-BE_2 + A)^{-1}$ is provided as a function of the at least one incident wavefront and of the optical system, and wherein A,B and the wavefront transfer function $\bar{b}_{pk}$ are provided as a function of the components of the optical system.

The at least one wavefront transfer function can also be provided for every predetermined order p in that it transforms the Taylor series $w^{(2)}, w^{(3)}, \ldots, w^{(p)}$ of the first p orders of each wavefront entering into the optical system into at least one of the Taylor series $w'^{(2)}, w'^{(3)}, \ldots, w'^{(p)}$ of the first p orders of the emergent wavefront. Alternatively, Taylor series can also be used in three dimensions, wherein in this event the at least one wavefront transfer function is provided for each predetermined order p in that, for $2 \leq q_x + q_y \leq p$, it transforms the Taylor series $w^{(q_x,q_y)}$ of the first p orders of each two-dimensional wavefront entering into the optical system into at least one of the Taylor series $w'^{(n_x,n_y)}$ of the first p orders of the emergent two-dimensional wavefront, wherein $2 \leq n_x + n_y \leq p$ applies, as well as $q_x, q_y \geq 0$ and $n_x, n_y \geq 0$.

In a further preferred embodiment (two-dimensional instance), the basic system is thus a decomposition for Taylor series (or, the basic system is defined or established via a decomposition for Taylor series), wherein the order parameter is an order p of the Taylor series; wherein the coefficients associated with the basic elements of the basic system are provided in that a p-th order coefficient of the incident wavefront is a Taylor series $w^{(p)}$ of the incident wavefront, and in that the p-th order coefficient of the associated emergent wavefront is a Taylor series $w'^{(p)}$ of the associated emergent wavefront; and wherein $p \geq 2$. The Taylor series can be Taylor series of the wavefront vertex depths or Taylor series of the wavefront OPD (OPD=Optical Path Difference).

In a preferred embodiment (two-dimensional instance), the basic system is thus a decomposition for Taylor series of the wavefront vertex depths, wherein the order parameter is an order p of the Taylor series of the wavefront vertex depths, wherein the coefficients associated with the basic elements of the basic system are provided in that a p-th order coefficient of the incident wavefront is a Taylor series $w^{(p)}$ of the vertex depth of the incident wavefront, and in that the p-th order coefficient of the associated emergent wavefront is a Taylor series $w'^{(p)}$ of the vertex depth of the associated emergent wavefront, and wherein $p \geq 2$. The designation $w^{(p)}$ thereby means the Taylor series of the order p of the function w of the incident wavefront, preferably at the location 0. $w'^{(p)}$ accordingly means the Taylor series of the order p of the function w' of the emergent wavefront, preferably at the location 0.

In an alternative preferred embodiment (two-dimensional instance), the basic system is a decomposition for Taylor series of a wavefront OPD (Optical Path Difference), wherein the order parameter is an order p of the Taylor series of the wavefront OPD, wherein the coefficients associated with the basic elements of the basic system are provided in that a p-th order coefficient of the incident wavefront is a Taylor series $OPD^{(p)}$ of the incident wavefront, and in that the p-th order coefficient of the associated emergent wavefront is a Taylor series $OPD'^{(p)}$ of the associated emergent wavefront, and wherein $p \geq 2$. The designation $OPD^{(p)}$ thereby means the Taylor series of the order p of the function OPD of the incident wavefront, preferably at the location 0. $OPD'^{(p)}$ accordingly means the Taylor series of the order p of the function OPD' of the emergent wavefront, preferably at the location 0.

In a further preferred embodiment (three-dimensional instance), the basic system is a decomposition for Taylor series (or, the basic system is defined or established by a decomposition for Taylor series), wherein the first order parameter is the sum p of orders $p_x$ and $p_y$ of the Taylor series; wherein the second order parameter is one of the orders $p_x$ and $p_y$; wherein the coefficients associated with the basic elements of the basic system are provided in that p-th order coefficients of the incident wavefront are Taylor series $w^{(px,py)}$ of the incident wavefront, and in that the p-th order coefficients of the associated emergent wavefront are Taylor series $w'^{(px,py)}$ of the associated emergent wavefront; and wherein $p \geq 2$ and $p_x \geq 0$ and $p_y \geq 0$. Here as well, the Taylor series can be Taylor series of the wavefront vertex depths or Taylor series of the wavefront OPD.

In a preferred embodiment (three-dimensional instance), the basic system is thus a decomposition for Taylor series of the wavefront vertex depths, wherein the first order parameter is the sum p of orders $p_x$ and $p_y$ of the Taylor series of the wavefront vertex depths; wherein the second order parameter is one of the orders $p_x$ and $p_y$; wherein the coefficients associated with the basic elements of the basic system are provided in that p-th order coefficients of the incident wavefront are Taylor series $w^{(px,py)}$ of the vertex depth of the incident wavefront, and in that the p-th order coefficients of the associated emergent wavefront are Taylor series $w'^{(px,py)}$ of the vertex depth of the associated emergent wavefront; and wherein $p \geq 2$ and $p_x \geq 0$ and $p_y \geq 0$. The designation $w^{(px,py)}$ thereby means the Taylor series of the order $p = p_x + p_y$ of the function w(x,y) of the incident wavefront, preferably at the location x=0, y=0. Accordingly, $w'^{(px,py)}$ means the Taylor series of the order $p=p_x+p_y$ of the function $w'(x', y')$ of the emergent wavefront, preferably at the location $x'=0$, $y'=0$.

In an alternative preferred embodiment (three-dimensional instance), the basic system is thus a decomposition for Taylor series of a wavefront OPD, wherein the first order parameter is the sum p of orders $p_x$ and $p_y$ of the Taylor series of the wavefront OPD; wherein the second order parameter is one of the orders $p_x$ and $p_y$; wherein the coefficients associated with the basic elements of the basic system are provided in that p-th order coefficients of the incident wavefront are Taylor series $OPD^{(px,py)}$ of the incident wavefront, and in that the p-th order coefficients of the associated emergent wavefront are Taylor series $OPD'^{(px,py)}$ of the associated emergent wavefront; and wherein p≥2 and $p_x$≥0 and $p_y$≥0. The designation $OPD^{(px,py)}$ thereby means the Taylor series of the order $p=p_x+p_y$ of the function OPD of the incident wavefront, preferably at the location x=0, y=0. Accordingly, $OPD'^{(px,py)}$ means the Taylor series of the order $p=p_x+p_y$ of the function OPD' of the emergent wavefront, preferably at the location $x'=0$, $y'=0$.

The at least one wavefront transfer function can, for each predetermined order p, also be provided in that it transforms the derivatives $t^{(1)}$, $t^{(2)}$, . . . , $t^{(i)}$ of the first i=p−1 orders of a direction function t(x) of each wavefront entering into the optical system into at least one of the derivatives $t'^{(1)}$, $t'^{(2)}$, . . . , $t'^{(i)}$ of the first i=p−1 orders of a direction function of the emergent wavefront. Alternatively, local directions of the wavefront can also be used in three dimensions, wherein in this event the at least one wavefront transfer function is provided for each predetermined order i=p−1 in that, for $2 \leq j_x+j_y \leq i$, it transforms the Taylor series $t_x^{(jx,jy)}$, $t_y^{(jx,jy)}$ of the first i=p−1 orders of each two-dimensional entering into the optical system into at least one of the derivatives $t'_x^{(nx,ny)}$, $t'_y^{(nx,ny)}$ of the first i=p−1 orders of the emergent two-dimensional wavefront, wherein $1 \leq n_x+n_y \leq i$ applies, as well as $j_x,j_y$≥0 and $n_x,n_y$≥0.

In a further preferred embodiment (two-dimensional instance), the basic system is thus a decomposition for derivatives of direction functions (or, the basic system is defined or established by a decomposition for derivatives of direction functions), wherein the order parameter is an order i of the derivatives of the direction functions, wherein the coefficients associated with the basic elements of the basic system are provided in that an i-th order coefficient of the incident wavefront is a derivative $t^{(i)}$ of a direction function t(x) of the incident wavefront, and in that an i-th order coefficient of the associated emergent wavefront is a derivative $t'^{(i)}$ of a direction function $t'^{(x')}$ of the associated emergent wavefront, and wherein i≥1.

In a further preferred embodiment (three-dimensional instance), the basic system is thus a decomposition for derivatives of direction functions (or, the basic system is defined or established by a decomposition for derivatives of direction functions), wherein the first order parameter is the sum i of orders $i_x$ and $i_y$ of the derivatives of the direction functions, wherein the second order parameter is the one of the orders $i_x$ and $i_y$, wherein the coefficients associated with the basic elements of the basic system are provided in that i-th order coefficients of the incident wavefront are derivatives $t_x^{(ix,iy)}$, $t_y^{(ix,iy)}$ of direction functions $t_x(x,y)$, $t_y(x,y)$ of the incident wavefront, and in that i-th order coefficients of the associated emergent wavefront are derivatives $t'_x^{(ix,iy)}$, $t'_y^{(ix,iy)}$ of direction functions $t'_x(x',y')$, $t'_y(x',y')$ of the associated emergent wavefront, and wherein i≥1 and $i_x$≥0 and $i_y$≥0 apply.

Zernike polynomials in two dimensions can also be used. The at least one wavefront transfer function can thereby be provided for each predetermined order p in that it transforms the Zernike coefficients $Z_2$, $Z_3$, . . . , $Z_p$ of the first p orders of each wavefront entering into the optical system into at least one of the Zernike coefficients $Z'_2$, $Z'_3$, . . . , $Z'_p$ of the first p orders of the emergent wavefront, wherein the Zernike coefficients in particular relate to an established pupil. Alternatively, Zernike polynomials in three dimensions can be used, wherein in this instance the at least one wavefront transfer function can thereby be provided for each predetermined order p in that, for 2≤q≤p, it transforms the Zernike coefficients $Z_q^r$ of the first p radial orders of each two-dimensional wavefront entering into the optical system into at least one of the Zernike coefficients $Z'_n^m$ of the first p radial orders of the emergent two-dimensional wavefront, wherein 2≤n≤p, and wherein n and q are the radial orders and m and r q are the azimuthal orders varying in steps of 2, wherein −q≤r≤q and −n≤m≤n, wherein the Zernike coefficients in particular relate to an established pupil.

In a further preferred embodiment (two-dimensional instance), the basic system is thus a decomposition for Zernike polynomials (or, the basic system is defined or established by a decomposition for Zernike polynomials), wherein the order parameter is a radial order n of the Zernike polynomials; wherein the coefficients associated with the basic elements of the basic system are provided in that an n-th order coefficient of the incident wavefront is a Zernike coefficient $Z_n$ of the incident wavefront, and in that an n-th order coefficient of the emergent wavefront is a Zernike coefficient $Z'_n$ of the associated emergent wavefront; wherein n≥2; and wherein the Zernike coefficients in particular relate to an established pupil.

In a further preferred embodiment (three-dimensional instance), the basic system is thus a decomposition for Zernike polynomials (or, the basic system is defined or established by a decomposition for Zernike polynomials), wherein the first order parameter is a radial order n of the Zernike polynomials; wherein the second order parameter is an azimuthal order m of the Zernike polynomials; wherein the coefficients associated with the basic elements of the basic system are provided in that n-th order coefficients of the incident wavefront are Zernike coefficients $Z_n^m$ of the incident wavefront, and in that n-th order coefficients of the associated emergent wavefront are Zernike coefficients $Z'_n^m$ of the associated emergent wavefront; wherein n≥2 and −n≤m≤n; wherein m is even for even n; wherein m is odd for odd n, and wherein the Zernike coefficients in particular relate to an established pupil.

A further independent aspect to achieve the object relates to a computer program product which comprises machine-readable program code which, when it is loaded on a computer, is suitable for executing the method according to the invention as described above. In particular, what is to be understood by a computer program product is a program stored on a data medium. In particular, the program code is stored on a data medium. In other words, the computer program product comprises computer-readable instructions which, when loaded into a memory of a computer and executed by the computer, have the effect that the computer implements a method according to the invention as described above. The computer program product can in particular comprise a storage medium readable by a computer, which storage medium has a code stored thereupon, wherein the code—when it is executed by a process—has the effect that the processor implements a method according to the invention. In particular, the computer program product can also comprise or be a storage medium with a computer program stored thereupon, wherein the computer program is designed to implement a method according to the invention when it is loaded and executed on a computer. In particular, the invention offers a computer program product, in particular in the form of a storage medium or a data stream, which contains program code which is designed to implement a method according to the invention, in particular in a preferred embodiment, when it is loaded and executed on a computer.

A further independent aspect to achieve the object relates to a device for simulating an optical system by means of calculating a wavefront, wherein the optical system is in particular a complex optical system whose effect exceeds a single refraction, a single propagation, or a single reflection, comprising:

a modeling module for providing at least one wavefront transfer function for the optical system, wherein the wavefront transfer function is designed to assign an associated emergent wavefront to every wavefront entering into the optical system under consideration of imaging errors with an order greater than the order of defocus;

an evaluation module for evaluating the at least one wavefront transfer function for at least one wavefront entering into the optical system.

The modeling module can comprise an interface and a storage device with which the wavefront transfer function can be provided and stored. What is understood by a provision of the wavefront transfer function is in particular a setting up of the wavefront transfer function. The setting up of the wavefront transfer function can thereby take place manually (by hand). The set-up wavefront transfer function can, in this event, be input into the modeling module, in particular with the aid of an input device. Alternatively, the wavefront transfer function can also be provided or set up automatically or as implemented by a computer. The modeling module can accordingly comprise a computing unit or a processor with which the wavefront transfer function can be (automatically) provided or setup.

In particular, the device also comprises a data interface for recording data of the optical system or total system, an assessment module for assessing the total optical system, and/or an optimization module for optimizing the first partial system.

In a further aspect, the invention relates to a method for producing a spectacle lens, comprising the steps:

calculating or optimizing a spectacle lens using a method according to the invention as described above; and providing manufacturing data of the spectacle lens calculated or optimized in such a way, and/or producing the spectacle lens calculated or optimized in such a way.

In particular, the invention relates to a method for producing a spectacle lens and/or for providing manufacturing data for the production of a spectacle lens, comprising a calculation or optimization of the spectacle lens using a method for simulating an optical system by means of a wavefront calculation, wherein the optical system is a complex optical system whose effect exceeds a single refraction, a single propagation, or a single reflection, and providing manufacturing data of the spectacle lens calculated or optimized in such a way, and/or manufacturing of the spectacle lens calculated or optimized in such a way, wherein the method for simulating the optical system comprises the following steps:

setting up at least one wavefront transfer function for the optical system, wherein the wavefront transfer function is designed to assign a respective associated emergent wavefront to wavefronts entering into the optical system under consideration of imaging errors with an order greater than the order of defocus;

evaluating the at least one wavefront transfer function for at least one wavefront entering into the optical system.

In particular, the provided manufacturing data comprise all data that are necessary to manufacture a spectacle lens. For example, the provided manufacturing data can comprise vertex depths of the spectacle lens to be manufactured.

In a further aspect, the invention relates to a device for producing a spectacle lens, comprising:

calculation or optimization means which are designed to calculate or optimize the spectacle lens using a method according to the invention; and (optional) finishing means which are designed to finish the spectacle lens (in particular according to the result of the calculation or optimization).

The device for producing a spectacle lens can be designed as one piece or be designed as a discrete machine, meaning that all components of the device (in particular the calculation or optimization means and the finishing means) can be components of one and the same system or can be one and the same machine. In a preferred embodiment, however, the device for producing a spectacle lens is designed not as one piece, but rather is realized by various (in particular respective discrete) systems or machines. For example, the calculation or optimization means can thus be realized as a first system (in particular comprising a computer) and the finishing means can be realized as a second system (in particular a machine comprising the finishing means). The various systems can thereby be located at different sites, i.e. be spatially separate from one another. For example, one or more systems can be in the frontend and one or more additional systems can be in the backend. The individual systems can, for example, be located at different company sites or be operated by different companies. The individual systems thereby in particular have communication means in order to exchange data among one another (for example via a data medium). The various systems of the device can preferably communicate directly with one another, in particular via a network (for example via a local network and/or via the Internet). The above statements with regard to the device for producing a spectacle lens apply not only to this device but rather generally to all devices described within the scope of the present invention. A device described herein can in particular be designed as a system. The system can in particular comprise a plurality of devices (spatially separate devices, if applicable) which are designed to execute individual method steps of a corresponding method.

In particular, the invention relates to a device for providing manufacturing data for the production of a spectacle lens, comprising calculation or optimization means which are designed to calculate or optimize the spectacle lens using a method for simulating an optical system by means of calculating a wavefront, wherein the optical system is a complex optical system whose effect exceeds a single refraction, a single propagation, or a single reflection. The method for simulating the optical system thereby comprises in particular the following steps:

providing at least one wavefront transfer function for the optical system, wherein the wavefront transfer function is designed to assign a respective associated emergent wavefront to every wavefront entering into the optical system, under consideration of imaging errors with an order greater than the order of defocus;

evaluating the at least one wavefront transfer function for at least one wavefront entering into the optical system.

In particular, the calculation or optimization means are designed to provide (in particular to calculate) the manufacturing data for producing a spectacle lens on the basis of the spectacle lens calculated or optimized in such a way. The device for providing manufacturing data for the production of a spectacle lens can also be a device for producing a spectacle lens. In particular, such a device for producing a spectacle lens can comprise manufacturing means or a manufacturing device (for example a suitable machine) with which the spectacle lens can be manufactured, in particular on the basis of manufacturing data.

The aforementioned devices for providing, determining, establishing, or calculating data (in particular manufacturing data for a spectacle lens) can be realized by suitably configured or programmed data processing devices (in particular specialized hardware modules, computers, or computer systems such as, for example, computing or data clouds) with corresponding computing units, electronic interfaces, storages, and data transmission units. The devices can also comprise at least one, preferably interactive, graphical user interface (GUI) which enables a user to view and/or input and/or modify data.

The aforementioned devices can also have suitable interfaces that enable a transmission, input, and/or readout of data (in particular manufacturing data for a spectacle lens). The devices may likewise comprise at least one storage unit, for example in the form of a database, which stores the data that are used.

The manufacturing device can, for example, comprise at least one CNC-controlled [sic] machine for direct processing of a lens blank according to the determined calculation or optimization specifications. Alternatively, the spectacle lens can be manufactured by means of a casting method. The finished spectacle lens can have a first simple spherical or rotationally symmetrical aspherical surface, and a second individual surface calculated with the aid of the method according to the invention. The simple spherical or rotationally symmetrical aspherical surface can be the anterior surface (i.e., the object-side surface) of the spectacle lens. However, it is self-evidently possible to arrange the individual surface as an anterior surface of the spectacle lens. Both surfaces of the spectacle lens can also be calculated individually.

In a further aspect, the invention relates to a use of a spectacle lens produced according to the production method according to the invention in a predetermined ordinary or individual usage position of the spectacle lens in front of the eyes of a defined spectacles wearer, for correction of an ametropia of the spectacles wearer.

The statements made in the preceding or in the following with regard to the embodiments of the first aspect also apply to the aforementioned further independent aspects, and in particular to preferred embodiments in this regard. In particular, the statements made in the preceding or in the following with regard to the embodiments of the respective other independent aspects also apply to an independent aspect of the present invention and to preferred embodiments in this regard.

Individual embodiments to achieve the object are described by way of example in the following using Figures The individual described embodiments thereby in part have features that are not absolutely necessary in order to execute the claimed subject matter, but that provide desired properties in defined use cases. Embodiments that do not have all features of the embodiments described in the following should thus also be considered to be disclosed as falling under the described technical teaching. In order to avoid unnecessary repetition, certain features are also mentioned only with reference to individual embodiments described in the following. It is noted in this regard that the individual embodiments should therefore be considered not only in isolation but rather also in combination. Using this synopsis, it is apparent to the person skilled in the art that individual embodiments can also be modified by incorporating individual or several features of other embodiments. It is noted in this regard that a systematic combination of the individual embodiments with individual or several features that are described with regard to other embodiments can be desirable and reasonable, and therefore should be entertained and also considered as encompassed by the specification.

DETAILED DESCRIPTION OF THE DRAWINGS

Figure 1:
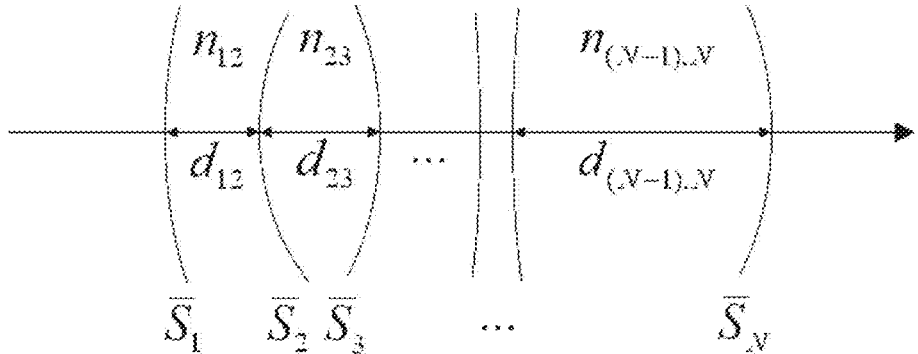
FIG. 1 shows a schematic diagram of an example of an optical system.

In the context of this invention, the following terms are used (insofar as is not specified otherwise, described in a meridian):

Ray

Infinitesimal light pencil, described as a straight line, half line, or line segment in space that are preferably described using piercing points through planes and direction parameters. In the event of a meridian, a ray is described by x position parameter of a ray t direction parameter of a ray $(x,t)$ parameter of an incident ray $(x',t')$ parameter of an emergent ray In the event of two meridians, a ray is described by x, y position parameter of a ray $t_x, t_y$ direction parameter of a ray $(x,y,t_x,t_y)$ parameter of an incident ray $(x',y',t'_x,t'_y)$ parameter of an emergent ray Wavefront In the event of a meridian, a wavefront is a curve in the observed meridian that is orthogonal to rays. For the sake of simplicity, a curve is thereby also referred to as a surface.

w(x) function to describe a wavefront as a surface $w^{(p)}$ derivative of the order p of the function w(x), preferably at the location x=0

$E_p=nw^{(p)}$ aberration of the order p of the wavefront w(x), wherein n is the index of refraction t(x) function to describe a wavefront via dependency of the direction parameter on the position parameter $t^{(i)}$ derivative of the order i of the function t(x), preferably at the location x=0 w(x), $w^{(p)}$, $E_p$, t(x), $t^{(i)}$ variables to describe the incident wavefront w'(x'), $w'^{(p)}$, $E'_p$, t'(x'), $t'^{(i)}$ variables to describe the emergent wavefront In the event of two meridians, a wavefront is a surface in space that is orthogonal to rays w(x, y) function to describe a wavefront as a surface $w^{(p_x,p_y)}$ derivative of the order $p=p_x+p_y$ of the function w(x,y), preferably at the location x=0, y=0

$E_{p_x,p_y}=nw^{(p_x,p_y)}$ aberration of the order $p=p_x+p_y$ of the wavefront w(x,y), wherein n is the index of refraction $t_x(x, y)$, $t_y(x, y)$ function to describe a wavefront via dependency of the direction parameter on the position parameter $t_x^{(i_x,i_y)}$, $t_x^{(i_x,i_y)}$ derivative of the order $i=i_x+i_y$ of the functions $t_x(x,y)$, $t_y(x,y)$, preferably at the location x=0, y=0 w(x,y), $w^{(p_x,p_y)}$, $E_{p_x,p_y}$, $t_x(x,y)$, $t_y(x,y)$, $t_x^{(i_x,i_y)}$, $t_y^{(i_x,i_y)}$ variables to describe the incident wavefront w'(x',y'), $w'^{(p_x,p_y)}$, $E'_{p_x,p_y}$, $t'_x(x',y')$, $t'_y(x',y')$, $t'_x^{(i_x,i_y)}$, $t'_y^{(i_x,i_y)}$ variables to describe the emergent wavefront.

Ray transfer function

In the event of a meridian, function $f(x,t)$, which assigns the parameters (x',t') of an emergent ray to an incident ray having parameters (x,t)

$f^{prop}(x,t)$ ray transfer function for pure propagation $f^{ref}(x,t)$ ray transfer function for pure refraction In the event of two meridians, function $f(x,y,t_x,t_y)$, which assigns the parameters (x',y',t'_x,t'_y) of an emergent ray to an incident ray having parameters (x,y, $t_x$,$t_y$)

$f^{prop}(x,y,t_x,t_y)$ ray transfer function for pure propagation $f^{ref}(x,y,t_x,t_y)$ ray transfer function for pure refraction Wavefront transfer function Function determined according to the invention, which assigns an emergent wavefront to an incident wavefront for a given ray transfer function $f(x,t)$ or $f(x,y,t_x,t_y)$ Wavefront transfer coefficients Coefficients determined according to the invention, which describe the transfer of a wavefront through the system for a given ray transfer function $f(x,t)$ of an optical system $\bar{c}_{ik}$ coefficient for determining the derivative $t'^{(i)}$ of the order i of an emergent wavefront that describes the dependency on the derivatives $t^{(1)}, \ldots, t^{(t)}$ of the function of an incident wavefront, wherein the tuple $k=(k_1, k_2, \ldots, k_i)$ relates to the contribution of the product;

$\bar{b}_{pk}$ coefficient for determining the derivative $w'^{(p)}$ or the aberration $E'_p$ of the order p of an emergent wavefront that describes the dependency on the derivatives $w^{(2)}, \ldots, w^{(p)}$ or on the aberrations $E_2, \ldots, E_p$ of an incident wavefront, wherein the tuple $k=(k_1, k_2, \ldots, k_{p-1})$ relates to the contribution of the product or $E_2^{k_1}E_3^{k_2} \ldots E_p^{k_{p-1}}$.

In a very general form, an optical system is already completely specified when there is a rule that uniquely defines an emergent ray for every incident ray (thus rule is called a ray transfer function). All further details of the optical system are then irrelevant to the specification of the optical behavior, such that the system can also be regarded as a "black box." If, attendant to a principal ray, a wavefront is now incident on such a system, according to the prior art the emergent wavefront can then be determined, inclusive of its HOA, only in that a sufficiently chosen pencil of neighboring rays is calculated in a complicated manner by means of ray tracing, and from this a wavefront on the emergent side is numerically determined again, for example via a fitting method.

A step-by-step analytical calculation from surface to surface by means of the methods from WO 2008 089 999 A1 and DE 10 2011 101 923 A1 does not achieve the object of the present invention, because not every optical system must in fact consist of individual components that can be described by refractive surfaces or propagations in a homogeneous medium. For example, aside from the input surface and the exit surface, a GRIN system (gradient index system) has no internal refracting surfaces whatsoever, and achieves its effect due to the inhomogeneity of the material. Such a GRIN system also has a well-defined behavior with regard to the mapping of rays, but the wavefront calculation cannot be performed with one of the methods described in WO 2008 089 999 A1 and DE 10 2011 101 923 A1.

Even if the complex optical system consists only of a finite number of refracting surfaces and propagations in a homogeneous medium, as is schematically depicted in FIG. 1, the methods from WO 2008 089 999 A1 and DE 10 2011 101 923 A1 do, in fact, yield a result, but only at the price of a very high computation time. This applies in particular if a high number of interfaces is present, or if an optical system should be calculated again and again very often with different wavefronts.

Although it might appear obvious to combine a serial execution of the existing methods from the prior art, via mutual insertion of the analytical formulas into an analytical method, the number of arising terms would thereby be so great that it appears completely futile to suitably combine these again so that a computation time advantage appears. However, this problem is also solved by the present invention, in that it foregoes the execution of the superfluous intermediate steps and sets up a rule for wavefront transfer that is based from the outset directly on the ray transfer function.

Figure 2:
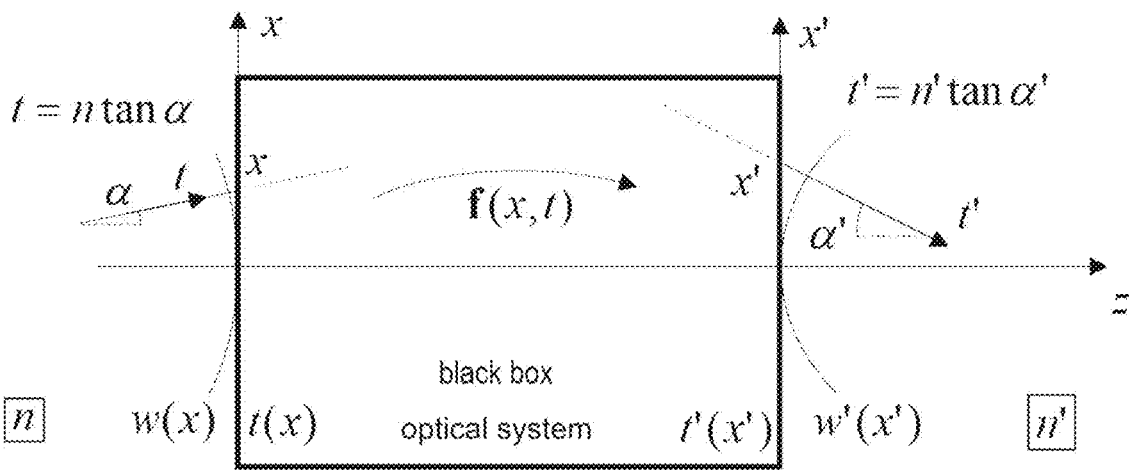
FIG. 2 shows a schematic diagram for specification of an optical system by means of a ray transfer function.

FIG. 2 schematically shows an optical system for definition of the ray transfer function. In linear optics, it is customary to limit a system per definition by an entrance plane and an exit plane. More generally, an optical system can also be limited by two non-parallel planes or by two arbitrary surfaces. However, it is significant to the specification that there are (initially, in the event of a single meridian) a coordinate x on the incident surface as well as a coordinate x' on the emergent surface, which serve to describe the piercing points of the ray. Furthermore, a unique possibility must exist to establish the direction of an incident ray with respect to the entrance surface (for instance by an angle α), as well as to define the direction of an emergent ray with respect to the exit surface (for instance by an angle α'). In the event of two meridians, two coordinates x, y and two angles $\alpha_x$, $\alpha_y$ must accordingly be present on the incident side, as well as coordinates x', y' and two angles $\alpha'_x$, $\alpha'_y$ on the emergent side.

$$\text{If } \rho := \begin{pmatrix} x \\ t \end{pmatrix} := \begin{pmatrix} x \\ n\tan\alpha \end{pmatrix} \tag{1}$$

$$\rho' := \begin{pmatrix} x' \\ t' \end{pmatrix} := \begin{pmatrix} x' \\ n'\tan\alpha' \end{pmatrix}$$

is then defined as a ray vector for a meridian, the optical system is uniquely specified if a ray transfer function $f: R^2 \rightarrow R^2$ with the components $f_x$, $f_t$ is present that transforms ρ according to ρ':

$$\rho' = f(\rho) \Leftrightarrow \begin{pmatrix} x' \\ t' \end{pmatrix} = \begin{pmatrix} f_x(x, t) \\ f_t(x, t) \end{pmatrix} \tag{2}$$

In two meridians, the optical system is uniquely specified if there is a corresponding ray transfer function $f: R^4 \rightarrow R^4$.

In both Gaussian optics ($f: R^2 \rightarrow R^2$) and in linear optics ($f: R^4 \rightarrow R^4$), it is prior art that the effect of a system described with $f$ is described by a system matrix T:

$$\rho' = T\rho, \; \Leftrightarrow \begin{pmatrix} x' \\ t' \end{pmatrix} = \begin{pmatrix} A & B \\ C & D \end{pmatrix} \begin{pmatrix} x \\ t \end{pmatrix} \tag{3}$$

wherein the 2×2 system matrix (also referred to as a transference) is defined by $$T = Jac(f) = \begin{pmatrix} \partial x'/\partial x & \partial x'/\partial t \\ \partial t'/\partial x & \partial t'/\partial t \end{pmatrix} = \begin{pmatrix} f_x^{(1,0)} & f_x^{(0,1)} \\ f_t^{(1,0)} & f_t^{(0,1)} \end{pmatrix} =: \begin{pmatrix} A & B \\ C & D \end{pmatrix} \tag{4}$$

wherein Jac is the Jacobi matrix, wherein the inputs A, B, C, D are constants that characterize the optical system, and wherein the notation $$f^m = f^{(m_x, m_t)} = \partial^m f = (\partial^{m_x}/\partial x^{m_x} \partial^{m_t}/\partial t^{m_t})f$$

is used. Furthermore, in the prior art it is known that, in a meridian, a wavefront with curvature k and vergence S=nk that enters into the system leads to a wavefront with vergence S'=n'k' upon existing, wherein the emergent vergence is provided by $$S' = \frac{-C - DS}{A - BS} \tag{5}$$

In the event of two meridians, a corresponding correlation can be specified; see Qiang L, Shaomin W, Alda J, Bernabeu E: "Transformation of nonsymmetric Gaussian beam into symmetric one by means of tensor ABCD law," Optic—International Journal for Light and Electron Optics (OPTIK) 85(2): 67-72 (1990). Furthermore, the system can also have non-linear components such as, for example, a prismatic effect.

The specification in Eq. (3) regarding the treatment of rays by means of a matrix T can be construed as a specification for the first order; the specification in Eq. (5) regarding the treatment of the vergences of wavefronts can be construed as a specification for the second order. Otherwise, in the prior art there is no available specification regarding the treatment of higher-order wavefront properties (HOAs) such as, for example, coma or spherical aberration if only the ray transfer function $f$ is present. The present invention applies at this point.

Figures 3, 4:
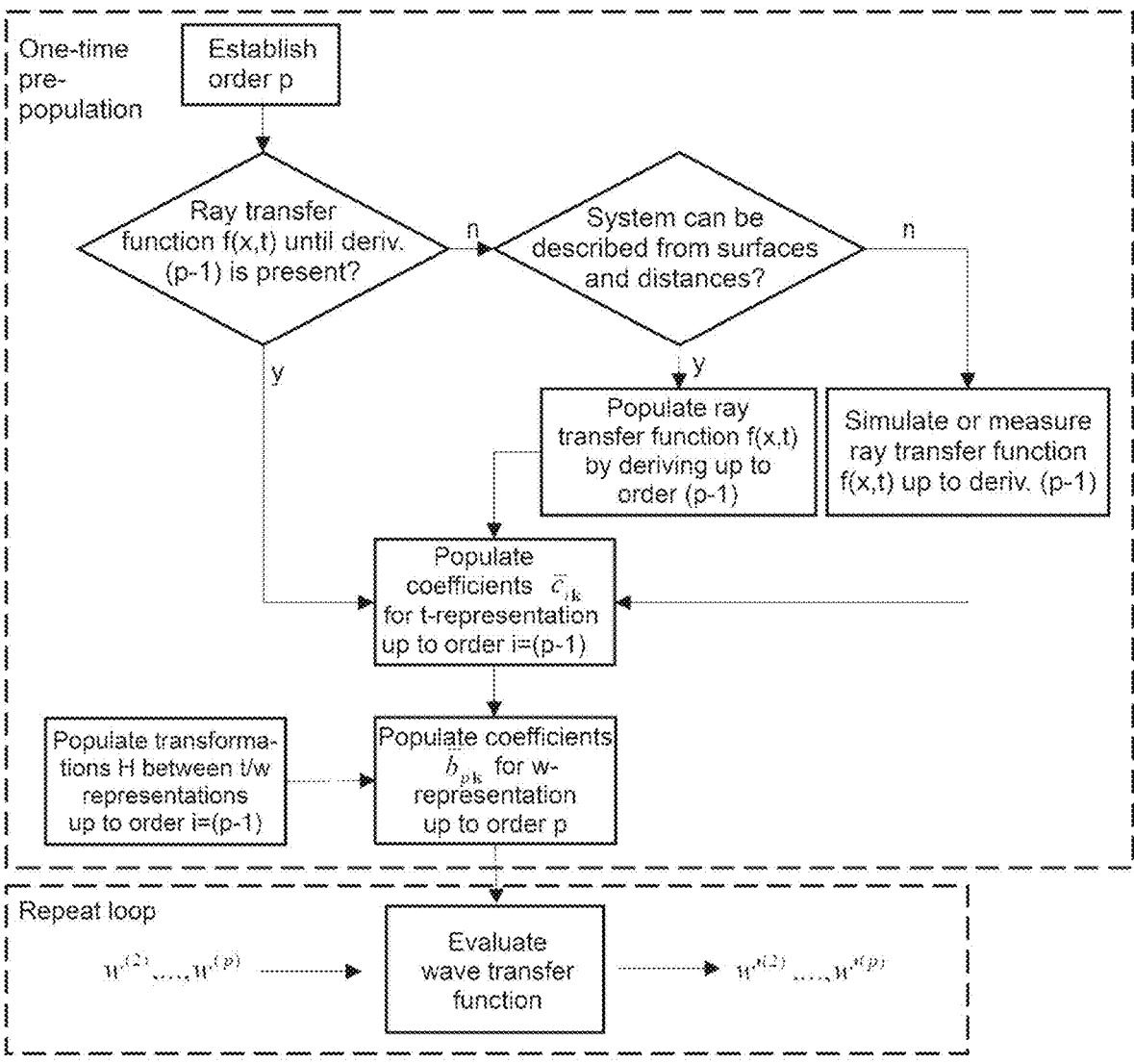
FIG. 3 shows a schematic diagram for the transformation between wavefronts $w(x),w'(x')$ in w-representation and functions $t(x),t'(x')$ in t-representation, according to an embodiment of the present invention.
FIG. 4 shows a schematic wavefront diagram according to an embodiment of the present invention based on Taylor series, in a meridian.

According to the invention, it has been recognized that a function t(x) that appears from w(x) via a unique and reversible transformation H belongs to a wavefront w(x). According to the invention, the fixed input variable t, which was originally developed for linear optics, is reinterpreted so that it can also be used for non-linear description of wavefronts in that a dependency t(x) is permitted. If x is varied, two functions x'(x) and t'(x) that implicitly define a correlation t'(x') are then obtained on the emergent side according to Eq. (2) . . . . This function t'(x') uniquely corresponds to an emergent wavefront w'(x') that is obtained by applying the transformation $H^{-1}$ inverse to H. This correlation is schematically depicted in FIG. 3.

Wavefronts can be represented as symbolic functions or as freeform surfaces, for example. Furthermore, wavefronts can be developed according to basic systems, wherein the order can act as an order parameter in the counting according to the basic systems. Order parameters can preferably be used so that contributions decrease in their numerical magnitude with increasing order parameter, so that contributions up to a defined value of the order parameter are taken into account and can be ignored for even greater values of the order parameter. One can proceed similarly given the presence of a plurality of order parameters.

Wavefronts are preferably represented by Zernike polynomials. In a particularly preferred embodiment of the invention, wavefronts are represented by Taylor series, meaning that they are characterized by their local derivatives at a reference position that is preferably located at x=0. In this embodiment, the order parameter is the order p of the derivative $w'^{(p)}(x')$ that should be determined; in two meridians, it is the sum $p=p_x+p_y$ of the orders of the derivative $w'^{(p_x,p_y)}(x', y')$.

In a specific embodiment, optical systems (in a meridian) are considered that have parallel entrance and exit planes and whose ray transfer function $f(x,t)$ has the property $f(0,0)=0$. A ray preferably strikes such a system at a location x=0 with direction t=0, which ray also leaves the system again with x'=0 and t'=0 due to $f(0,0)=0$. According to a further feature of the embodiment, the basic procedure occurs using a Taylor series for the wavefronts in that evaluation preferably takes place at the location x=0. Incident and emergent wavefronts that must be orthogonal to the rays then automatically have disappearing first derivatives $w^{(1)}(0)=0$ and $w'^{(1)}(0)=0$.

FIG. 4 shows a schematic wavefront diagram according to an embodiment of the present invention based on Taylor series in a meridian. In this embodiment, after establishing an order p, the ray transfer function $f(x,t)$ must also be present in the form of all of its partial derivatives $f_x^{(1,0)}(0,0)$, $f_x^{(0,1)}(0,0)$, $f_t^{(1,0)}(0,0)$, $f_t^{(0,1)}(0,0)$, $f_x^{(2,0)}(0,0)$, . . . up to the order (p−1). If these are present, in the next step the method for determining the wavefront transfer function can then be implemented directly, preferably to populate wavefront transfer coefficients for the wavefront calculation (see FIG. 4). However, if the derivatives are not present, these must be determined beforehand. In the event that the optical system consists of a sequence of refracting surfaces whose intervening spaces consist of homogeneous media, the derivatives of $f(x,t)$ can then be determined from the shape and position of the surfaces and the indices of refraction. If all surfaces are preferably orthogonal to the ray at x=0, the derivatives of $f(x,t)$ can then be determined from the derivatives of the surfaces and from their separations. However, if no interposed surfaces are present (for example in a GRIN material), the derivatives of $f(x,t)$ must then be determined otherwise, for example via measurement or via simulation.

The method can, for example, be executed in that the coefficients $\bar{c}_{ik}$ are determined via calculation in the t-representation in the derivatives of $f(x,t)$ up to the order i=p−1. This can take place numerically or, preferably, symbolically. In a preferred embodiment, however, the coefficients $\bar{b}_{pk}$ with regard to the wavefront calculation in the w-representation up to the order p can be determined first from the coefficients $\bar{c}_{ik}$ with the aid of the transformation H, directly from the coefficients $\bar{c}_{ik}$ and from the derivatives $f(x,t)$, wherein this step can be performed numerically or, preferably, symbolically.

If the coefficients $\bar{b}_{pk}$ up to the order p are present once, the wavefront calculation of wavefronts up to the order p can then be repeated with arbitrarily many wavefronts.

For a wavefront calculation given reversed light direction, the inverse function can alternatively be formed from the ray transfer function $f$, and then the method according to the invention can be used to determine coefficients $\bar{c}_{ik}$ or coefficients $\bar{b}_{pk}$, or the wavefront transfer function already determined up to an order p can be directly inverted, for given coefficients, in order to determine the derivatives of the incident wavefront via the derivatives of the emergent wavefront.

Embodiment for the Transformation H

Every correlation between a wavefront w(x) and a function t(x) is a transformation. A transformation can be described symbolically or numerically. A preferred embodiment is to also expand the function t(x) in a Taylor series, and to express the derivatives $t^{(i)}(x)$ via $w^{(p)}(x)$, preferably for x=0.

The object of transforming the description of a spatial surface via w(x) into a function t(x) that is related to a plane is achieved according the invention as follows. In contrast to the prior art, in which the OPD also provides an inducement with regard to a function $\tau(x)$ that has a defined correlation with the wavefront w(x), t(x) designates a direction and not an OPD. Therefore, here a correlation must first be established between t(x) and $\tau(x)$.

Figure 5:
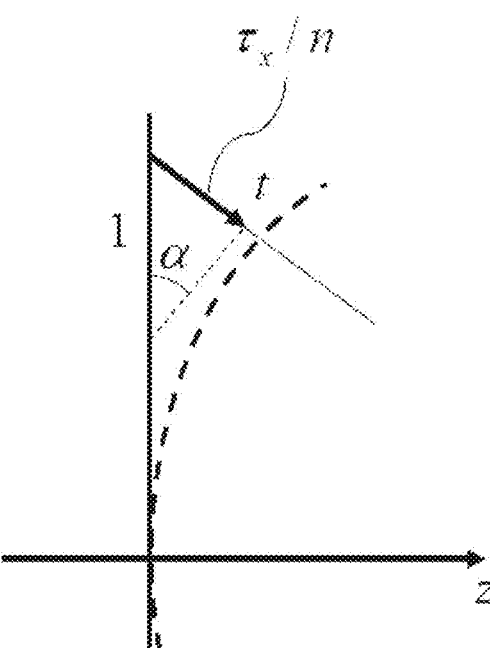
FIG. 5 shows a schematic diagram of the correlation between the OPD $\tau(x)$ and the direction of a $t(x)$ ray that is orthogonal to a wavefront $w(x)$.

In FIG. 5, a wavefront is shown together with its reference plane, both of which are pierced by a neighboring ray with direction t. The tangent of the direction angle $\alpha$, which by definition is provided by tan $\alpha$=t/n, is otherwise identical to the side ratio of the right triangle shown in FIG. 5. If the length of the hypotenuse is set equal to 1, the length of the side opposite to $\alpha$ is then provided by $\tau_x/n$ (proportional to the derivative of the OPD). This yields the equation $$\tan\alpha =: \frac{t(x)}{n} = \frac{-\tau_x(x)/n}{\sqrt{1-(\tau_x(x)/n)^2}} \tag{6}$$

Repeated derivation of Eq. (6) for x and evaluation for x=0 leads to $$t^{(1)} = -\tau^{(2)} \tag{7}$$
$$t^{(2)} = -\tau^{(3)}$$
$$t^{(3)} = -\tau^{(4)} - 3\,\tau^{(2)^3}/n^2$$
$$t^{(4)} = -\tau^{(5)} - 18\tau^{(2)^2}\tau^{(3)}/n^2$$
$$\vdots$$

and substitution of the derivatives $\tau^{(2)}$, $\tau^{(3)}$, $\tau^{(4)}$, ... with the expressions from Eq. (B6) in "Appendix B" of the publication by G. Esser, W. Becken, W. Müller, P. Baumbach, J. Arasa, D. Uttenweiler: "Derivation of the refractive equations for higher order aberrations of local wavefronts by oblique incidence," J. Opt. Soc. Am. A 27, 218-237 (2010), yields for the transformation H:

$$t^{(1)} = -nw^{(2)} \tag{8}$$
$$t^{(2)} = -nw^{(2)}$$
$$t^{(3)} = -n(w^{(4)} - 6w^{(2)^3}) - 3(nw^{(2)})^3/n^2$$
$$\qquad -n(w^{(4)} - 3w^{(2)^3})$$
$$t^{(4)} = -n(w^{(5)} - 40w^{(2)^2}w^{(3)}) - 18(nw^{(2)})^2(nw^{(3)})/n^2$$
$$\qquad -n(w^{(5)} - 22w^{(2)^2}w^{(3)})$$
$$\vdots$$

Via reversal of these equations, the transformation $H^{-1}$ is obtained:

$$w^{(2)} = -t^{(1)}/n \tag{9}$$
$$w^{(3)} = -t^{(2)}/n$$
$$w^{(4)} = -(t^{(3)} + 3\,t^{(1)^3}/n^2)/n$$
$$w^{(5)} = -(t^{(4)} + 22t^{(1)^2}t^{(2)}/n^2)/n$$
$$\vdots$$

Populating the Ray Transfer Functions for an Elementary Propagation and Refraction

Propagation

Figure 6:
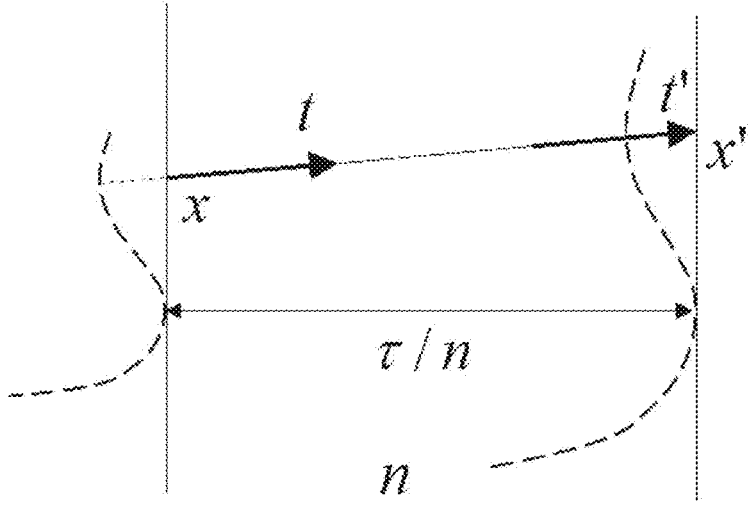
FIG. 6 shows a schematic diagram of the ray transfer function for the propagation.

FIG. 6 shows a schematic diagram of the ray transfer function for propagation. A ray that propagates from an entrance plane to an exit plane at a distance d=$\tau$/n, wherein T is the OPD that was traversed by the light given orthogonal incidence, exits there with an offset. The ray transfer function is therefore relatively simple because the direction does not change, and therefore t'=t. The spatial component satisfies (x'−x)/($\tau$/n)=tan $\alpha$=t/n, such that x'=x+t$\tau$/n². The ray transfer function therewith reads $$\binom{x'}{t'} = f^{prop}(x,t) = \binom{x+t\tau/n^2}{t} \tag{10}$$

Remarkably, the ray transfer function $f^{prop}(x,t)$ for the propagation in Eq. (10) depends only linearly on both x and t. Therefore, the derivatives $f^{prop(n_x,n_t)}(x,t)$ of $f^{prop}(x,t)$ are very simple and vanish for all higher orders $n_x + n_t \geq 2$, as shown in the following Table 1.

TABLE 1

| | | | | | |
|---|---|---|---|---|---|
| Derivatives of the ray transfer function $f^{prop}(x, t)$ at the location $(x, t) = (0, 0)$ | | | | | |
| Wavefront order | Der. ord. $n_x + n_t$ | x ord. $n_x$ | t ord. $n_t$ | $f_x^{prop(n_x, n_t)}$ | $f_t^{prop(n_x, n_t)}$ |
| 1 | 0 | 0 | -0 | 0 | 0 |
| 2 | 1 | 1 | 0 | 1 | 0 |
| 2 | 1 | 0 | 1 | $\tau/n^2$ | 1 |

All higher orders vanish

In the special case of a vanishing propagation distance $\tau=0$, the ray transfer function $f^{prop}(x,t)$ must be the identity with Jacobi matrix $Jacf^{prop}=1$. The single entry by which the derivatives differ from this trivial case is $f_x^{prop(0,1)}=\tau/n^2$.

Refraction

Figure 7:
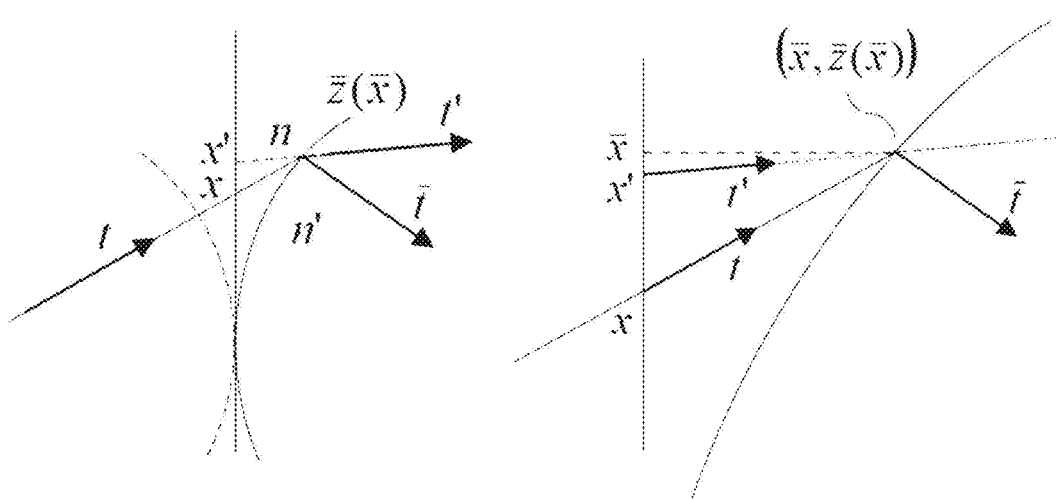
FIGS. 7a and 7b show schematic diagrams of the ray transfer function for the refraction.

FIG. 7 shows a schematic diagram of the ray transfer function for propagation. Refraction is markedly more difficult to handle, and specifying a ray transfer function $f^{ref}(x,t)$ for refraction in a closed shape as a function of the properties of the refracting surface is, inter alia, not possible. This is due to the fact that the piercing point of a neighboring ray through an arbitrary surface can only be determined iteratively. Although, for wavefronts, there is a possibility to transform the spatial surface $w(x)$ into a property $t(x)$ by means of transformation H, it additionally occurs that there is inherently no corresponding transformation for the refracting surface without mishandling the present parallax. The refraction thus must continue to occur at a point in space that, inter alia, lies outside of the entrance plane.

Since no propagation occurs for a pure refraction, the exit plane is identical to the entrance plane. The object to be achieved according to the invention thus reads: if a neighboring ray $(x,t)$ is present that starts at the entrance plane in the direction of a refracting surface, which parameters $(x',t')$ as a function of $(x,t)$ then correspond to the refracted ray, relative to the same plane?

The preferred field of application of the method relates to situations in which the ray $(x,t)$ has a unique intersection point with the surface. This intersection point is designated with $(\bar{x}, z(\bar{x}))$, wherein the piercing coordinate is given by the unique function $\bar{x}(x,t)$. The direction tangent of the surface normal is designated with $\bar{t}$ (see FIG. 7). It is given by the negative of the first derivative of the surface, $\bar{t}=-\bar{z}^{(1)}$, which likewise is a function of x and thus also a function $\bar{t}(x,t)=\bar{t}(\bar{x}(x,t))$. According to Snell's law, the directions t of the incident ray and $\bar{t}$ of the surface indicate a direction t' of the refracted ray, and the rearward extension of the refracted ray intersects the entrance plane at the unique position x' (see FIG. 7).

Snell's law states that $$n'\sin(\arctan(t'/n') - \arctan t) =$$ (11)

$$n\sin(\arctan(t/n) - \arctan t) \Leftrightarrow \frac{t'-n'\bar{t}}{\sqrt{1+(t'/n')^2}} = \frac{t-n\bar{t}}{\sqrt{1+(t/n)^2}}$$

which, after solving for t', yields $$t'(x, t) = n'\frac{bn - w\bar{z}^{(1)}}{w + bn\bar{z}^{(1)}}$$ (12)

wherein $$w = \sqrt{n'^2 - n^2 b^2}, \quad b = \frac{t + n\bar{z}^{(1)}}{\sqrt{n^2 + t^2}\sqrt{1 + \bar{z}^{(1)^2}}}$$ (13)

and $\bar{z}^{(1)}$ is evaluated at the position $\bar{x}(x,t)$.

As soon as $\bar{x}(x,t)$ and $t'(x,t)$ are known, it can be directly read geometrically from FIG. 7 that $$x'(x, t) = \bar{x}(x, t) - \frac{t'(x, t)}{n'}\bar{z}(\bar{x}(x, t))$$ (14)

must be so. The ray transfer function for refraction therewith reads.

$$\begin{pmatrix} x' \\ t' \end{pmatrix} = f^{ref}(x, t) = \begin{pmatrix} \bar{x}(x, t) - t'(x, t)\bar{z}(\bar{x}(x, t))/n' \\ t'(x, t) \end{pmatrix}$$ (15)

According to the invention, a method is also provided for calculating the function $\bar{x}(x,t)$. The direction of the incident ray satisfies the relationship $\tan \alpha = t/n$, and therefore $$\frac{t}{n} = \frac{\bar{x}(x, t) - x}{\bar{z}(\bar{x}(x, t))}$$ (16)

Although Eq. (16) cannot be completely solved for $\bar{x}(x,t)$, the partial derivatives with regard to $(x,t)$ from Eq. 16 can be established, and these can be successively solved for the derivatives $\bar{x}^{(1,0)}$, $\bar{x}^{(0,1)}$, $\bar{x}^{(2,0)}$, $\bar{x}^{(1,1)}$, $\bar{x}^{(0,2)}$, $\bar{x}^{(3,0)}$ etc. at the position $(x,t)=(0,0)$.

Another embodiment, whose advantage is a more compact notation, exists in the selection of a suitable formulation $\bar{x}_{Formulation}(x,t)$ and the introduction of the function $$\bar{x}(x, t) = \bar{x}_{Formulation}(x, t) + \delta\bar{x}(x, t)$$ (17)

in Eq. 16. The function $\bar{x}_{Formulation}(x,t)$ is referred to as a consistent solution of Eq. (16) in the order k, and k is referred to as a consistency order of the function $\bar{x}_{Formulation}(x,t)$ if $(k+1)$ is the lowest order for which one of the derivatives $\delta\bar{x}^{(1,0)}$, $\delta\bar{x}^{(0,1)}$, $\delta\bar{x}^{(2,0)}$, $\delta\bar{x}^{(1,1)}$, $\delta\bar{x}^{(0,2)}$, $\delta\bar{x}^{(3,0)}$ etc. does not vanish. The following Table 2 shows the various embodiments of the function $\bar{x}_{Formulation}(x,t)$ and their order consistency.

TABLE 2

| $\bar{x}_{Formulation}(x, t)$ | Order consistency |
|---|---|
| x | 2 |
| $x + t/n\bar{z}(x)$ | 4 |
| $x + t/n\bar{z}(x + t/n\bar{z}(x))$ | 6 |

33

TABLE 2-continued

| $\bar{x}_{Formulation}(x, t)$ | Order consistency |
|---|---|
| $x + \dfrac{t/n\ \bar{z}(x)}{1 - t/n\ \bar{z}^{(1)}(x)}$ | 6 |

Analogous to Table 1, in the following Table 3 the derivatives of the ray transfer function $f^{ref}(x,t)$ are shown for refraction. In contrast to the case of $f_{prop}(x,t)$, the table for $f^{ref}(x,t)$ does not, inter alia, terminate given a non-finite order. Except for $f_x^{ref^{(1,0)}}=1$ and $f_t^{ref^{(0,1)}}=1$, all entries in Table 3 are proportional to $(n-n')$. That is to be expected, because $f^{ref}(x,t)$ for n'=n must reduce to the identity with Jacobi matrix $Jac f^{ref}=1$.

TABLE 3

Derivatives of the ray transfer function $f^{ref}$ (x, t) at the location (x, t) = (0, 0)

| Order of the wave-front $n_x + n_t$ | Der. Ord. $n_x + n_t$ | x Ord. $n_x$ | t Ord. $n_t$ | $f_t^{ref(n_x,n_t)}$ | $f_t^{ref(n_x,n_t)}$ |
|---|---|---|---|---|---|
| 1 | 0 | 0 | 0 | 0 | 0 |
| 2 | 1 | 1 | 0 | 1 | $-(n'-n)\bar{z}^{(2)}$ |
| 2 | 1 | 0 | 1 | 0 | |
| 3 | 2 | 2 | 0 | 0 | $-(n'-n)\bar{z}^{(3)}$ |
| 3 | 2 | 1 | 1 | 0 | 0 |
| 3 | 2 | 0 | 2 | 0 | 0 |
| 4 | 3 | 3 | 0 | $(n'-n)\times 3/n'\bar{z}^{(2)^2}$ | $-(n'\,n)\,(\bar{z}^{(4)}+3n/n'^2(n-n')\bar{z}^{(2)^3})$ |
| 4 | 3 | 2 | 1 | $(n'-n)/(nn')\bar{z}^{(2)}$ | $-(n'-n)/(nn'^2)(3n^2-nn'+n'^2)\bar{z}^{(2)^2}$ |
| 4 | 3 | 1 | 2 | 0 | $-(n'-n)/(nn'^2)(3n+n')\bar{z}^{(2)}$ |
| 4 | 3 | 0 | 3 | 0 | $-(n'-n)\times 3/(n^2n'^2)(n+n')$ |

Actual Calculation Through the Optical System

The actual goal is to find, for the emergent light, a function t'(x') that satisfies the equation $$f(x, t(x)) = \begin{pmatrix} f_x(x, t(x)) \\ f_t(x, t(x)) \end{pmatrix} = \begin{pmatrix} x'(x) \\ t'(x'(x)) \end{pmatrix} \quad (18)$$

for a given function t(x).

This goal is preferably achieved via introduction of the intermediate variables $$u(x) := x'(x) \quad (19)$$
$$v(x) := t'(x'(x))$$

with which Eq. 18 assumes the formula $$\begin{pmatrix} u(x) \\ v(x) \end{pmatrix} = f(x, t(x)) \quad (20)$$

A combination of the two equations (19) and (20) yields $$v(x) = t'(u(x)) \quad (21)$$

which represents the starting point of the method. The basic principle exists in the repeated derivation of Eq. (21)

34

$$v^{(1)} = u^{(1)}t'^{(1)} \quad (22)$$
$$v^{(2)} = \left(u^{(1)}\right)^2 t'^{(2)} + u^{(2)}t'^{(1)}$$
$$v^{(3)} = \left(u^{(1)}\right)^3 t'^{(3)} + 3u^{(1)}u^{(2)}t'^{(2)} + u^{(3)}t'^{(1)}$$
$$\vdots$$

wherein the argument '(0)' is omitted for better legibility. The first step in achieving the goal is to solve Eq. 22 successively for the sought derivatives $t'^{(1)}$, $t'^{(2)}$, $t'^{(3)}$, . . . , and therewith to express, via the derivatives of u and v:

$$t'^{(1)} = \frac{v^{(1)}}{u^{(1)}} \quad (23)$$
$$t'^{(2)} = \frac{u^{(1)}v^{(2)} - u^{(2)}v^{(1)}}{\left(u^{(1)}\right)^3}$$
$$t'^{(3)} = \frac{u^{(1)}v^{(3)} - u^{(3)}v^{(1)}}{\left(u^{(1)}\right)^4} - 3u^{(2)}\frac{u^{(1)}v^{(2)} - u^{(2)}v^{(1)}}{\left(u^{(1)}\right)^5}$$
$$\vdots$$

The second step is to express the derivatives of u and v via derivatives of the function t(x) (incident light) and derivatives of $f(x,t)$ (properties of the optical system). Deriving Eq. (20) for $u^{(i)}$ leads to $$u^{(1)} = f_x^{(0,1)}t^{(1)} + f_x^{(1,0)} \quad (24)$$
$$u^{(2)} = f_x^{(1,0)}t^{(2)} + f_x^{(2,0)} + 2f_x^{(1,1)}t^{(1)} + f_x^{(0,2)}t^{(1)^2}$$
$$u^{(3)} = f_x^{(0,1)}t^{(3)} + f_x^{(3,0)} +$$
$$3\left(f_x^{(2,1)} + f_x^{(1,2)}t^{(1)}\right)t^{(1)} + 3\left(f_x^{(1,1)} + f_x^{(0,2)}t^{(1)}\right)t^{(2)} + f_x^{(0,3)}t^{(1)^3}$$
$$\vdots$$

$$v^{(1)} = u^{(1)}(f_x \to f_t)$$
$$v^{(2)} = u^{(2)}(f_x \to f_t)$$
$$v^{(3)} = u^{(3)}(f_x \to f_t)$$

-continued $$\vdots$$

wherein the arguments '(0)' and '(0, 0)' are omitted. A preliminary result for $t'^{(i)}$, expressed by $t'^{(i)}$, is then obtained in that Eq. (24) is inserted into Eq. (23).

Solutions in t-Representation

If Eq. (24) is inserted into Eq. (23) for $t'^{(i)}$, with increasing order i a great many similar terms with mixed terms are created rapidly from powers of derivatives $t^{(i)}$ whose evaluation requires a great deal of computation time given use of numerical values for $t^{(i)}$. Therefore, the object of setting up a computation time-saving method that can be repeatedly evaluated with many different wavefronts is not yet solved via simple insertion of Eq. (24) into Eq. (23). According to the invention, rather, it has been recognized that the symbolic expressions that describes [sic] must be sorted and summarized before the insertion of numerical values, so that only the minimum number of mixed terms from powers of derivatives $t^{(i)}$ must be numerically evaluated.

The order i=1 still directly yields a fraction $$t'^{(1)} = \frac{f_t^{(0,1)}t^{(1)} + f_t^{(1,0)}}{f_x^{(0,1)}t^{(1)} + f_x^{(1,0)}} = \frac{Dt^{(1)} + C}{Bt^{(1)} + A} =: \beta\left(Dt^{(1)} + C\right) \qquad (25)$$

wherein, for the sake of brevity, the shortened form $$\frac{1}{\beta} := u^{(1)} = f_x^{(0,1)}t^{(1)} + f_x^{(1,0)} = Bt^{(1)} + A \qquad (26)$$

can be used.

The next-higher order $t'^{(2)}$ in Eq. (23) already yields:

$$t'^{(2)} = \beta^3\left(u^{(1)}v^{(2)} - u^{(2)}v^{(1)}\right) \qquad (27)$$

$$= \beta^3\left[\begin{array}{l} \left(Bt^{(1)} + A\right)\left(Dt^{(2)} + f_t^{(2,0)} + 2f_t^{(1,1)}t^{(1)} + f_t^{(0,2)}t^{(1)2}\right) - \\ \left(Dt^{(1)} + C\right)\left(Bt^{(2)} + f_x^{(2,0)} + 2f_x^{(1,1)}t^{(1)} + f_x^{(0,2)}t^{(1)2}\right) \end{array}\right]$$

$$= \beta^3\left[\begin{array}{l} (AD - BC)t^{(2)} + (BD - DB)t^{(1)}t^{(2)} + \\ \left(Af_t^{(2,0)} - Cf_x^{(2,0)}\right) + \left(Bf_t^{(2,0)} + 2Af_t^{(1,1)} - \\ Df_t^{(2,0)} - 2Cf_x^{(1,1)}\right)t^{(1)} + \\ \left(Af_t^{(0,2)} + 2Bf_t^{(1,1)} - Cf_x^{(0,2)} - 2Df_x^{(1,1)}\right)t^{(1)2} + \\ \left(Bf_t^{(0,2)} - Df_x^{(0,2)}\right)t^{(1)3} \end{array}\right]$$

$$= \beta^3\left[\begin{array}{l} t^{(2)} + \left(Af_t^{(2,0)} - Cf_x^{(2,0)}\right) + \\ \left(Bf_t^{(2,0)} + 2Af_t^{(1,1)} - Df_t^{(2,0)} - 2Cf_x^{(1,1)}\right)t^{(1)} + \\ \left(Af_t^{(0,2)} + 2Bf_t^{(1,1)} - Cf_x^{(0,2)} - 2Df_x^{(1,1)}\right)t^{(1)2} + \\ \left(Bf_t^{(0,2)} - Df_x^{(0,2)}\right)t^{(1)3} \end{array}\right]$$

meaning that, for example, four contributions to the power $t^{(1)2}$, which can be factored out, and its prefactors can thus be combined into the prefactor $$\left(Af_t^{(0,2)} + 2Bf_t^{(1,1)} - Cf_x^{(0,2)} - 2Df_x^{(1,1)}\right).$$

According to the invention, the method can be applied independently of the value of the determinant det T=AD−BC. The invention preferably utilizes that optical systems are symplectic and satisfy det T=AD−BC=1.

Continued insertion and combination leads to solutions of the structure $$t'^{(1)} = \beta\left[\overline{c}_{1,1}t^{(1)} + \overline{c}_{1,0}\right] \qquad (28)$$

$$t'^{(2)} = \beta^3\left[t^{(2)} + \overline{c}_{2,0} + \overline{c}_{2,1}t^{(1)} + \overline{c}_{2,2}t^{(1)2} + \overline{c}_{2,3}t^{(1)3}\right]$$

$$t'^{(3)} = \beta^4\left[t^{(3)} + \beta\left(\begin{array}{c} \left(\overline{c}_{3,0} + \overline{c}_{3,1}t^{(1)} + \overline{c}_{3,2}t^{(1)2} + \overline{c}_{3,3}t^{(1)3} + \right. \\ \left. \overline{c}_{3,4}t^{(1)4} + \overline{c}_{3,5}t^{(1)5}\right) + \\ \left(\overline{c}_{3,01} + \overline{c}_{3,11}t^{(1)} + \overline{c}_{3,21}t^{(1)2}\right)t^{(2)} + \overline{c}_{3,02}t^{(2)2} \end{array}\right)\right]$$

$$t'^{(4)} = \beta^5\left[\begin{array}{c} t^{(4)} + \beta^2\left(\begin{array}{c} \left(\overline{c}_{4,0} + \overline{c}_{4,1}t^{(1)} + \ldots + \overline{c}_{4,7}t^{(1)7}\right) + \\ \left(\overline{c}_{4,01} + \overline{c}_{4,11}t^{(1)} + \ldots + \overline{c}_{4,41}t^{(1)4}\right)t^{(2)} + \\ \left(\overline{c}_{4,02} + \overline{c}_{4,12}t^{(1)} + \overline{c}_{4,22}t^{(1)2}\right)t^{(2)2} + \overline{c}_{4,03}t^{(2)3} \end{array}\right) + \\ \beta\left(\left(\overline{c}_{4,001} + \overline{c}_{4,101}t^{(1)} + \overline{c}_{4,201}t^{(1)2}\right)t^{(3)} + \overline{c}_{4,011}t^{(2)}t^{(3)}\right) \end{array}\right]$$

$$t'^{(5)} = \beta^6\left[t^{(5)} + \ldots\right]$$

In general, the solutions $t'^{(i)}$ are provided by a sum formulation of the formula $$t'^{(i)} = \beta^{-\overline{r}_1^0(i)}\sum_{k_1,k_2,\ldots,k_i}\overline{c}_{ik}\beta^{-\Delta\overline{r}_1(i,k^*)}t^{(1)k_1}t^{(2)k_2}\ldots t^{(i)k_i} \qquad (29)$$

$$= \beta^{-\overline{r}_1^0(i)}\left[t^{(i)} + \sum_{k_1,k_2,\ldots,k_{i-1}}\overline{c}_{ik}\beta^{-\Delta\overline{r}_1(i,k^*)}t^{(1)k_1}t^{(2)k_2}\ldots t^{(i-1)k_{i-1}}\right],$$

$$i = 1, 2, 3, \ldots$$

provided with coefficients $\overline{c}_{ik}$, wherein the lower line applies only in the symplectic case, and wherein $k=(k_1, k_2 \ldots k_i)$ is a tuple $k \in N_0^i$ of exponents; $k=(k_2, \ldots, k_i)$ is a tuple that appears from k by leaving off the first element; $k^{**}=(k_3, \ldots k_i)$ appears from k by leaving off the first two elements.

The exponents of $\beta$ are provided by $$-\overline{r}_1^0(i) = (i+1) - \delta_{i1} \qquad (30)$$

$$-\Delta\overline{r}_1(i, k^*) = (i-2) + \delta_{i1} - P(k^{**})$$

The coefficients $\overline{c}_{ik}$ are indicated in Table 4. For better legibility, a shortened notation can be used $$T_{AC}^{(n_x,n_t)} := Af_t^{(n_x,n_t)} - Cf_x^{(n_x,n_t)} \qquad (31)$$

$$T_{BD}^{(n_x,n_t)} := Bf_t^{(n_x,n_t)} - Df_x^{(n_x,n_t)}$$

as well as a symmetry transformation X that replaces each derivative $f_x^{(n_x,n_t)}$, $f_t^{(n_x,n_t)}$ with $X(f_x^{(n_x,n_t)})$ or $X(f_t^{(n_x,n_t)})$ and exists in an exchanging of the orders $n_x$, $n_t$ as well as an algebraic sign:

$$X\left(f_x^{(n_x,n_t)}\right) = (-1)^{n_x+n_t} f_x^{(n_t,n_x)} \tag{32}$$

$$X\left(f_t^{(n_x,n_t)}\right) = (-1)^{n_x+n_t+1} f_t^{(n_t,n_x)}$$

Eq. 32 directly implies X(A)=−B, X(B)=−A, X(C)=D, X(D)=C and, for the expressions in Eq. (31), $$X\left(T_{AC}^{(n_x,n_t)}\right) = (-1)^{n_x+n_t} T_{BD}^{(n_t,n_x)} \tag{33}$$

$$X\left(T_{BD}^{(n_x,n_t)}\right) = (-1)^{n_x+n_t} T_{AC}^{(n_t,n_x)}$$

The summation in Eq. (29) is constructed so that the tuple k* runs over a range $k^* \in P_\cup(i-1)$ that depends only on the order i, wherein the set $P_\cup$ is defined by $$P_\cup(p) := \{k \in N_0^p \mid P(k) \le p\} = \bigcup_{q=1}^{p} P(q) \tag{34}$$

wherein $P(p) := \{k \in N_0^p \mid P(k) = p\} = \bigcup_{m=1}^{p} P(p, m)$ wherein $P(p, m) := \{k \in N_0^p \mid P(k) = p \wedge M(k) = m\}$ The numbers used in Eq. (34) are the variable M(k) and the partition order P(k) and are defined by $$M(k) := \sum_{v=1}^{p} k_v = k_1 + k_2 + \ldots + k_p \tag{35}$$

$$P(k) := \sum_{v=1}^{p} vk_v = k_1 + 2k_2 + \ldots + pk_p.$$

The index $k_1$ thereby runs over the range $0 \le k_1 \le 2(i-P(k^*)-1)+\delta_{P(k^*),0}$, which depends on the order i and k*.

Figure 8:
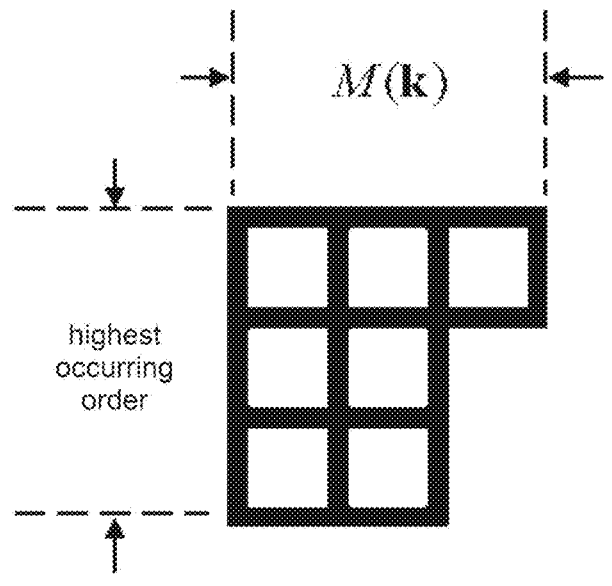
FIG. 8 show a schematic diagram of a Young diagram for the tuple $k=(1,0,2)$.
Figure 9:
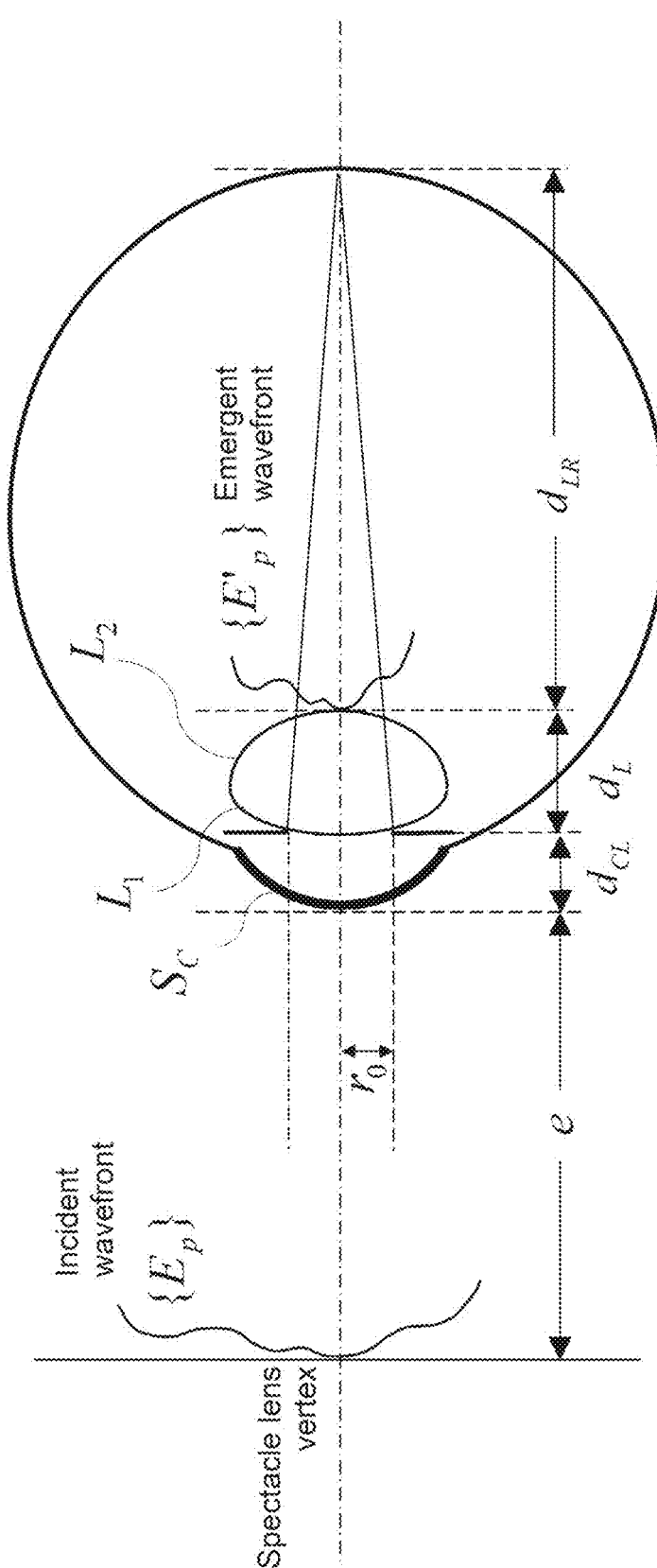
FIG. 9 shows a schematic diagram of a modified Gullstrand-Emsley eye (mGE eye) to illustrate an exemplary embodiment of the present invention.

As an alternative to the representation by specification, a tuple can also be graphically represented, preferably with the aid of Young diagrams (see FIG. 7). A particularly preferred form of this representation is to select the diagram for a given tuple k so that the number of boxes is equal to P(k). If $i_{max}$ is the index (thus the order) of the highest non-vanishing entry of k, the Young diagram, as depicted in FIG. 8, contains a rectangle of $i_{max}$ rows and $k_{i_{max}}$ columns on its left side. All further columns of the diagram are added to the right, as next a rectangle of $(i_{max}-1)$ rows and $k_{i_{max}-1}$ columns, and the diagram ends on its right side with a rectangle of one row and $k_1$ columns.

In the following Table 4, the coefficients $\bar{c}_{ik}$ are specified for general optical systems and for a simple propagation over a distance d=τ/n, as well as for a propagation through a single surface with surface derivatives $\bar{z}^{(2)}$, $\bar{z}^{(3)}$, $\bar{z}^{(4)}$, . . . between two media with indices of refraction n and n'.

TABLE 4

| | | | | | | | | Simple propagation, distance | Refraction at single |
| Ord | Indices | | Pre-factor | Term | Sym- | | | | |
| i | $k_1$ | k* | $\beta^{-\Delta r_1}$ | Term | bol | General case | | τ/n | surface (β = 1) |
|---|---|---|---|---|---|---|---|---|---|
| 1 | 0 | 0 | 1 | 1 | $\bar{c}_{1,0}$ | C | | 0 | $-(n' - n)\bar{z}^{(2)}$ |
| 1 | 1 | 0 | 1 | $t^{(1)}$ | $\bar{c}_{1,1}$ | $X(\bar{c}_{1,1}) = D$ | | 1 | 1 |
| 2 | 0 | 0 | 1 | 1 | $\bar{c}_{2,0}$ | $T_{AC}^{(2,0)}$ | | 0 | $-(n' - n)\bar{z}^{(3)}$ |
| 2 | 1 | 0 | 1 | $t^{(1)}$ | $\bar{c}_{2,1}$ | $2T_{AC}^{(1,1)} + T_{BD}^{(2,0)}$ | | 0 | 0 |
| 2 | 2 | 0 | 1 | $(t^{(1)})^2$ | $\bar{c}_{2,2}$ | $X(\bar{c}_{2,1}) = T_{AC}^{(0,2)} + 2T_{BD}^{(1,1)}$ | | 0 | 0 |
| 2 | 3 | 0 | 1 | $(t^{(1)})^3$ | $\bar{c}_{2,3}$ | $X(\bar{c}_{2,0}) = T_{BD}^{(0,2)}$ | | 0 | 0 |
| 2 | 0 | 1 | 1 | $t^{(2)}$ | $\bar{c}_{2,01}$ | 1 | | 1 | 1 |
| 3 | 0 | 0 | β | 1 | $\bar{c}_{3,0}$ | $-3T_{AC}^{(2,0)} f_x^{(2,0)} + AT_{AC}^{(3,0)}$ | | 0 | $-(n' - n)\left(\bar{z}^{(4)} + 3(n^2/n'^2 - 1)\bar{z}^{(2)^3}\right)$ |
| 3 | 1 | 0 | β | $t^{(1)}$ | $\bar{c}_{3,1}$ | $-6T_{AC}^{(2,0)} f_x^{(1,1)} - 3\left(T_{BD}^{(2,0)} + 2T_{AC}^{(1,1)}\right) f_x^{(2,0)} + 3AT_{AC}^{(2,1)} + BT_{AC}^{(3,0)} + AT_{BD}^{(3,0)}$ | | 0 | $-3(n' - n)(n' + 3n)/n - 2\bar{z}^{(2)^3}$ |

TABLE 4-continued

| | | | | | | | | |
|---|---|---|---|---|---|---|---|---|
| | | | | | | Coefficient $\bar{c}_{ik} \equiv \bar{c}_{i,(k_i,k')}$ | | |
| Ord | Indices | | Pre-factor $\beta^{-\Delta r}$ | Term | Sym- | | Simple propagation, distance | Refraction at single |
| i | $k_1$ | $k^*$ | Term | Term | bol | General case | $\tau/n$ | surface ($\beta = 1$) |
| 3 | 2 | 0 | $\beta$ | $(t^{(1)})^2$ | $\bar{c}_{3,2}$ | $3A(T_{AC}^{(1,2)} + T_{BD}^{(2,1)}) + B(3T_{AC}^{(2,1)} + T_{BD}^{(3,0)}) - 3T_{AC}^{(2,0)}f_x^{(0,2)} - 6(2T_{AC}^{(1,1)} + T_{BD}^{(2,0)})f_x^{(1,1)} - 3(T_{AC}^{(0,2)} + 2T_{BD}^{(1,1)})f_x^{(2,0)}$ | 0 | $-3(n'-n)(2n'+3n)/(nn'^2)\bar{z}^{(2)}$ |
| 3 | 3 | 0 | $\beta$ | $(t^{(1)})^3$ | $\bar{c}_{3,3}$ | $X(\bar{c}_{3,2})$ | 0 | $-(n'-n)(n'+n)/(n^2n'^2)$ |
| 3 | 4 | 0 | $\beta$ | $(t^{(1)})^4$ | $\bar{c}_{3,4}$ | $X(\bar{c}_{3,1})$ | 0 | 0 |
| 3 | 5 | 0 | $\beta$ | $(t^{(1)})^5$ | $\bar{c}_{3,5}$ | $X(\bar{c}_{3,0})$ | 0 | 0 |
| 3 | 0 | 1 | $\beta$ | $t^{(2)}$ | $\bar{c}_{3,01}$ | $-3(BT_{AC}^{(2,0)} - AT_{AC}^{(1,1)} + f_x^{(2,0)})$ | 0 | 0 |
| 3 | 1 | 1 | $\beta$ | $t^{(1)}t^{(2)}$ | $\bar{c}_{3,11}$ | $-3(BT_{BD}^{(2,0)} - AT_{AC}^{(0,2)} + 3f_x^{(1,1)})$ | 0 | 0 |
| 3 | 2 | 1 | $\beta$ | $(t^{(1)})^2t^{(2)}$ | $\bar{c}_{3,21}$ | $X(\bar{c}_{3,01})$ | 0 | 0 |
| 3 | 0 | 2 | $\beta$ | $(t^{(2)})^2$ | $\bar{c}_{3,02}$ | $-3B$ | $-3\tau/n^2$ | 0 |
| 3 | 0 | 01 | $\beta$ | $t^{(3)}$ | $\bar{c}_{3,001}$ | 1 | 1 | 1 |
| 4 | 0 | 0 | $\beta^1$ | 1 | $\bar{c}_{4,0}$ | $15T_{AC}^{(2,0)}(f_x^{(2,0)})^2 + A(AT_{AC}^{(4,0)} - 6T_{AC}^{(3,0)}f_x^{(2,0)} - 4T_{AC}^{(2,0)}f_x^{(3,0)})$ | 0 | $-(n'-n)\begin{pmatrix} \bar{z}^{(3)} + 2(n-n')/n'^2 \times \\ (9n + 11n')\bar{z}^{(2)2}\bar{z}^{(3)} \end{pmatrix}$ |
| 4 | 1 | 0 | $\beta^2$ | $t^{(1)}$ | $\bar{c}_{4,1}$ | $-2(9AT_{AC}^{(2,1)} + 5BT_{AC}^{(3,0)} + AT_{BD}^{(3,0)})f_x^{(2,0)} + 15(2T_{AC}^{(1,1)} + T_{BD}^{(2,0)})(f_x^{(2,0)})^2 - 12(AT_{AC}^{(3,0)} - 5T_{AC}^{(2,0)}f_x^{(2,0)})f_x^{(1,1)} + A\begin{pmatrix} 4AT_{AC}^{(3,1)} + 2BT_{AC}^{(4,0)} + AT_{BD}^{(4,0)} - \\ 12T_{AC}^{(2,0)}f_x^{(2,1)} - 8(T_{AC}^{(1,1)} + T_{BD}^{(2,0)})f_x^{(3,0)} \end{pmatrix}f_x^{(1,1)}$ | 0 | $-2(n'-n)\cdot(7n'+18n)/n'^2\bar{z}^{(2)}\bar{z}^{(3)}$ |
| 4 | 2 | 0 | $\beta^2$ | $(t^{(1)})^2$ | $\bar{c}_{4,2}$ | $A^2(6T_{AC}^{(2,2)} + 4T_{BD}^{(3,1)}) + 2AB(4T_{AC}^{(3,1)} + T_{BD}^{(4,0)}) + 60T_{AC}^{(2,0)}(f_x^{(0,1)})^2 - 6(AT_{AC}^{(3,0)} + 5T_{AC}^{(2,0)}f_x^{(2,0)}) + B^2T_{AC}^{(4,0)} + 4\begin{pmatrix} -9AT_{AC}^{(2,1)} - BT_{AC}^{(3,0)} - 5AT_{BD}^{(3,0)} + \\ 15(2T_{AC}^{(2,1)} + T_{BD}^{(2,0)}f_x^{(2,0)}) \end{pmatrix}f_x^{(1,1)} - 12AT_{AC}^{(2,0)}f_x^{(1,2)} + 3\begin{pmatrix} \begin{pmatrix} 2A(3T_{AC}^{(1,2)} + 5T_{BD}^{(2,1)}) + 2B(T_{AC}^{(2,1)} + T_{BD}^{(1,0)}) - \\ 5(T_{AC}^{(0,2)} + 2T_{BD}^{(1,1)})f_x^{(2,0)} \end{pmatrix}f_x^{(2,0)} + \\ 8(AT_{AC}^{(1,1)} + BT_{AC}^{(2,0)})f_x^{(2,1)} \end{pmatrix} - 4(AT_{AC}^{(0,2)} + B(4T_{AC}^{(1,1)} + T_{BD}^{(2,0)})f_x^{(3,0)}$ | 0 | $-2(n'-n)\cdot(5n'+9n)/(nn^2)\bar{z}^{(3)}$ |
| 4 | 3 | 0 | $\beta^2$ | $(t^{(1)})^3$ | $\bar{c}_{4,3}$ | $A^2(4T_{AC}^{(1,3)} + 6T_{BD}^{(2,2)}) + 4AB(3T_{AC}^{(2,2)} + 2T_{BD}^{(3,1)}) + B^2(4T_{AC}^{(3,1)} + T_{BD}^{(4,0)}) - AT_{AC}^{(2,0)}f_x^{(0,3)} + 2\begin{pmatrix} -5BT_{AC}^{(3,0)} - A(9T_{AC}^{(2,1)} + T_{BD}^{(2,0)}) + \\ 30T_{AC}^{(2,0)}f_x^{(1,1)} + 15(2T_{AC}^{(1,1)} + T_{BD}^{(2,0)})f_x^{(2,0)} \end{pmatrix}f_x^{(0,2)} +$ | 0 | 0 |

TABLE 4-continued

| | | | | | | Coefficient $\bar{c}_{ik} \equiv \bar{c}_{i,(k_i,k')}$ | | |
|---|---|---|---|---|---|---|---|---|
| Ord | Indices | | Pre-factor | Term | Sym- | | Simple propagation, distance | Refraction at single |
| i | $k_1$ | $k^*$ | $\beta^{-\Delta r_1}$ | Term | bol | General case | $\tau/n$ | surface ($\beta = 1$) |

$$\begin{pmatrix} 20\left(2T_{AC}^{(1,1)} + T_{BD}^{(2,0)}\right)\left(f_x^{(1,1)}\right)^2 - \\ 8\left(AT_{AC}^{(1,1)} + BT_{AC}^{(2,0)}\right)f_x^{(1,2)} + \\ 3\left(-2\begin{pmatrix} AT_{AC}^{(0,3)} + BT_{AC}^{(1,2)} + \\ 5AT_{BD}^{(1,2)} + 3BT_{BD}^{(2,1)} \end{pmatrix} + 5T_{BD}^{(0,2)}f_x^{(2,0)}\right)f_x^{(2,0)} - \\ 4\begin{pmatrix} 3AT_{AC}^{(1,2)} + BT_{AC}^{(2,1)} + 5AT_{BD}^{(2,1)} + \\ BT_{BD}^{(1,0)} - 5\left(T_{AC}^{(0,2)} + 2T_{BD}^{(1,1)}\right)f_x^{(2,0)} \end{pmatrix}f_x^{(1,1)} - \\ 4\left(AT_{BD}^{(0,2)} + 4BT_{AC}^{(1,1)} + BT_{BD}^{(2,0)}\right)f_x^{(2,1)} \end{pmatrix} -$$

$$8\left(AT_{BD}^{(0,2)} + BT_{BD}^{(1,1)}\right)f_x^{(3,0)}$$

| i | $k_1$ | $k^*$ | $\beta^{-\Delta r_1}$ | Term | bol | General case | $\tau/n$ | surface |
|---|---|---|---|---|---|---|---|---|
| 4 | 4 | 0 | $\beta^2$ | $(t^{(1)})^4$ | $\bar{c}_{4,4}$ | $X(\bar{c}_{4,3})$ | 0 | 0 |
| 4 | 5 | 0 | $\beta^2$ | $(t^{(1)})^5$ | $\bar{c}_{4,5}$ | $X(\bar{c}_{4,2})$ | 0 | 0 |
| 4 | 6 | 0 | $\beta^2$ | $(t^{(1)})^6$ | $\bar{c}_{4,6}$ | $X(\bar{c}_{4,1})$ | 0 | 0 |
| 4 | 7 | 0 | $\beta^2$ | $(t^{(1)})^7$ | $\bar{c}_{4,7}$ | $X(\bar{c}_{4,0})$ | 0 | 0 |

| 4 | 0 | 1 | $\beta^2$ | $t^{(2)}$ | $\bar{c}_{4,01}$ | $6A^2 T_{AC}^{(2,1)} - 12AT_{AC}^{(2,0)}f_x^{(1,1)} + 30BT_{AC}^{(2,0)}f_x^{(2,0)} -$ | 0 | $-6(n'-n)(2n'+3n)/n'^2\bar{z}^{(2)2}$ |

$$18AT_{AC}^{(1,1)}f_x^{(2,0)} + 15\left(f_x^{(2,0)}\right)^2 - 6ABT_{AC}^{(3,0)} + 4Af_x^{(3,0)}$$

| 4 | 1 | 1 | $\beta^2$ | $t^{(1)}t^{(2)}$ | $\bar{c}_{4,11}$ | $-60AT_{AC}^{(1,1)}f_x^{(1,1)} + 12A^2 T_{AC}^{(1,2)}f_x^{(1,1)} + 30BT_{BD}^{(2,0)}f_x^{(2,0)} -$ | 0 | $-6(n'-n) \cdot (5n'+6n)/(nn'^2)\bar{z}^{(2)}$ |

$$10B^2 T_{AC}^{(3,0)} - 2ABT_{BD}^{(3,0)} - 18AT_{AC}^{(0,2)}f_x^{(2,0)} -$$

$$12AT_{AC}^{(2,0)}f_x^{(0,2)} + 24BT_{AC}^{(1,1)}f_x^{(2,0)} +$$

$$36BT_{AC}^{(2,0)}f_x^{(1,1)} + 90f_x^{(2,0)}f_x^{(1,1)} - 18Af_x^{(2l,1)}$$

| 4 | 2 | 1 | $\beta^2$ | $(t^{(1)})^2$ $t^{(2)}$ | $\bar{c}_{4,21}$ | $6\begin{pmatrix} A^2 T_{AC}^{(0,3)} - 3B^2 T_{AC}^{(2,1)} - B^2 T_{BD}^{(3,0)} - 7AT_{AC}^{(1,1)}f_x^{(0,2)} - \\ 8AT_{AC}^{(0,2)}f_x^{(1,1)} + 3A^2 T_{BD}^{(1,2)} + 8BT_{BD}^{(2,0)}f_x^{(1,1)} + \\ 7BT_{BD}^{(1,1)}f_x^{(2,0)} + 20\left(f_x^{(1,1)}\right)^2 - Af_x^{(1,2)} + \\ AB\left(f_x^{(0,2)}f_x^{(2,0)} - f_x^{(2,0)}f_x^{(0,2)}\right) + 10f_x^{(2,0)}f_x^{(0,2)} - \\ Bf_x^{(2,1)} \end{pmatrix}$ | 0 | $-18(n'-n) \cdot (n'+n)/(n^2 n'^2)$ |

| 4 | 3 | 1 | $\beta^2$ | $(t^{(1)})^3 t^{(2)}$ | $\bar{c}_{4,31}$ | $X(\bar{c}_{4,11})$ | 0 | 0 |
| 4 | 4 | 1 | $\beta^2$ | $(t^{(1)})^4 t^{(2)}$ | $\bar{c}_{4,41}$ | $X(\bar{c}_{4,01})$ | 0 | 0 |

| 4 | 0 | 2 | $\beta^2$ | $(t^{(2)})^2$ | $\bar{c}_{4,02}$ | $3\begin{pmatrix} A^2 T_{AC}^{(0,2)} - 6ABT_{AC}^{(1,1)} + \\ 5B^2 T_{AC}^{(2,0)} - 4Af_x^{(1,1)} + 10Bf_x^{(2,0)} \end{pmatrix}$ | 0 | 0 |

| 4 | 1 | 2 | $\beta^2$ | $t^{(1)}$ $(t^{(2)})^2$ | $\bar{c}_{4,11}$ | $3\begin{pmatrix} -AB\left(3T_{AC}^{(0,2)} + 2T_{BD}^{(1,1)}\right) + \\ 5B^2 T_{BD}^{(2,0)} - 5Af_x^{(0,2)} + 20Bf_x^{(1,1)} \end{pmatrix}$ | 0 | 0 |

| 4 | 2 | 2 | $\beta^2$ | $(t^{(1)})^2$ $(t^{(2)})^2$ | $\bar{c}_{4,22}$ | $6B\left(-2AT_{BD}^{(0,2)} + 2BT_{BD}^{(1,1)} + 3f_x^{(0,2)}\right)$ | 0 | 0 |

| 4 | 0 | 01 | $\beta$ | $t^{(3)}$ | $\bar{c}_{4,001}$ | $2\left(2AT_{AC}^{(1,1)} - 2BT_{AC}^{(2,0)} - 3f_x^{(2,0)}\right)$ | 0 | 0 |

| 4 | 1 | 01 | $\beta$ | $t^{(1)}t^{(3)}$ | $\bar{c}_{4,101}$ | $4\left(AT_{AC}^{(0,2)} - BT_{BD}^{(0,2)} - 4f_x^{(1,1)}\right)$ | 0 | 0 |

| 4 | 2 | 01 | $\beta$ | $(t^{(1)})^3$ $t^{(3)}$ | $\bar{c}_{4,201}$ | $X(\bar{c}_{4,001})$ | 0 | 0 |

| 4 | 0 | 3 | $\beta^2$ | $(t^{(2)})^3$ | $\bar{c}_{4,03}$ | $15B^2$ | $15\tau^2/n^4$ | 0 |
| 4 | 0 | 11 | $\beta$ | $t^{(2)}t^{(3)}$ | $\bar{c}_{4,011}$ | $-10B$ | $-10\tau/n^2$ | 0 |
| 4 | 0 | 001 | 1 | $t^{(4)}$ | $\bar{c}_{4,0001}$ | 1 | 1 | 1 |

TABLE 4-continued

| | | | | | | | | Coefficient $\bar{c}_{ik} \equiv \bar{c}_{i,(k_i,k')}$ | |
|---|---|---|---|---|---|---|---|---|---|
| Ord | Indices | | Pre-factor | Term | Sym- | | | Simple propagation, distance | Refraction at single |
| i | $k_1$ | $k^*$ | $\beta^{-\Delta r_1}$ | Term | bol | General case | | $\tau/n$ | surface ($\beta = 1$) |
| 5 | 0 | 0 | $\beta^3$ | 1 | $\bar{c}_{5,0}$ | . . . | | 0 | $-(n'-n)\times$ $\begin{pmatrix} z^{(6)} + (\ldots\ )z^{(2)^3} + \\ (\ldots\ )z^{(2)^2}z^{(4)} + \\ (\ldots\ )z^{(3)}z^{(3)^2} \end{pmatrix}$ |
| . | . | . | . | . | . | . | | . | . |
| . | . | . | . | . | . | . | | . | . |
| . | . | . | . | . | . | . | | . | . |
| 5 | 0 | 0 | 1 | 1 | $\bar{c}_{5,0000}$ | 1 | | 1 | 1 |
| 6 | 0 | 0 | $\beta^4$ | 1 | $\bar{c}_{5,0}$ | | | 0 | $-(n'-n)\times$ $\begin{pmatrix} z^{(7)} + (\ldots\ )z^{(2)^4}z^{(3)} + \\ (\ldots\ )z^{(2)^2}z^{(5)} + \\ (\ldots\ )z^{(2)}z^{(3)}z^{(4)} + \\ (\ldots\ )z^{(3)^3} \end{pmatrix}$ |

Solutions in w-Representation

The solutions for the derivatives of the wavefronts $w'^{(p)}$ are obtained via the transformation H (see FIG. 3) in order to describe the derivatives $w'^{(2)}$, $w'^{(3)}$, $w'^{(4)}$, . . . of the emergent wavefront as a function of the derivatives $w^{(2)}$, $w^{(3)}$, $w^{(4)}$, . . . of the incident wavefront. For this purpose, Eq. (9) can be applied to $W'^{(p)}$, $t'^{(i)}$ instead of to $w^{(p)}$, $t^{(i)}$, and yields $w'^{(2)}=-t'^{(1)}/n'$, $w'^{(3)}=-t'^{(2)}/n'$, $w'^{(4)}=-(t'^{(3)}+3t'^{(1)^3}/n'^2)/n'$, . . . . Afterward, all derivatives $t'^{(i)}$ on the right side of these equations can be substituted with the solutions of the t-representation from Eq. (28), (29), and thus be expressed by the derivatives $t^{(k)}$. Finally, the inverse transformation $H^{-1}$ is then applied in that all derivatives $t^{(k)}$ are replaced by corresponding functions of derivatives $w^{(k)}$ according to Eq. (8).

The result does not yet achieve the object of optimally short calculation time in the evaluation because—due to the transformations H, $H^{-1}$—mixed terms are created that occur multiple times. According to the invention, however, these can be summarized again in the form $$E'_2 = \beta[\bar{b}_{2,1}E_2 + \bar{b}_{2,0}] \qquad (36)$$

$$(E)'_3 = \beta^3[E_3 + \bar{b}_{3,0} + \bar{b}_{3,1}E_2 + \bar{b}_{3,2}E_2^2 + \bar{b}_{3,3}E_2^3]$$

$$E'_4 = \beta^4\left[E_4 + \beta\left(\begin{array}{l}(\bar{b}_{4,0} + \bar{b}_{4,1}E_2 + \bar{b}_{4,2}E_2^2 + \bar{b}_{4,3}E_2^3 + \bar{b}_{4,4}E_2^4 + \bar{b}_{4,5}E_2^5) + \\ (\bar{b}_{4,01} + \bar{b}_{4,11}E_2 + \bar{b}_{4,21}E_2^2)E_3 + \bar{b}_{4,02}E_3^2\end{array}\right)\right]$$

$$E'_5 = \beta^5\left[E_5 + \beta^2\left(\begin{array}{l}(\bar{b}_{5,0} + \bar{b}_{5,1}E_2 + \ldots + \bar{b}_{5,7}E_2^7) + \\ (\bar{b}_{5,01} + \bar{b}_{5,11}E_2 + \ldots + \bar{b}_{5,41}E_2^4)E_3 + \\ (\bar{b}_{5,02} + \bar{b}_{5,12}E_2 + \ldots + \bar{b}_{5,22}E_2^2)E_3^2 + \bar{b}_{5,03}E_3^3\end{array}\right) + \right.$$
$$\left. \beta((\bar{b}_{5,001} + \bar{b}_{5,101}E_2 + \bar{b}_{5,201}E_2^2)E_3 + \bar{b}_{5,011}E_3E_4)\right]$$

-continued $$E'_6 = \beta^6[E_6 + \ldots]$$

wherein $$\beta = (-BE_2 + A)^{-1} \qquad (37)$$

and wherein, for a simpler interpretation with ophthalmic variables, the notation $E'_p=n'w'^{(p)}$, $E_p=nw^{(p)}$ was used (by definition, the least non-vanishing order that corresponds to the curvature belongs to the order p=2 in the w-representation, but to i=1 in the t-representation). A comparison of Eq. (36) with Eq. (28) shows that the solutions $E'_p$ for p=i+1 have exactly the same structure as the solutions $t'^{(i)}$. Actually, Eq. (36) can be summarized via a sum formulation:

$$E'_p = \beta^{-r_1^0}(p-1) \sum_{k_1,k_2,\ldots,k_{p-1}} \bar{b}_{pk}\beta^{-\Delta r_1(p-1,k^*)}E_2^{k_1}E_3^{k_2}\ldots E_p^{k_{p-1}} \qquad (38)$$

$$= \beta^{-r_1^0}(p-1)\left[E_p + \sum_{k_1,k_2,\ldots,k_{p-2}} \bar{b}_{pk}\,\beta^{-\Delta r_1(p-1,k^*)}\right.$$
$$\left. E_2^{k_1}E_3^{k_2}\ldots E_{p-1}^{k_{p-2}}\right],$$

$$p = 2, 3, 4, \ldots$$

wherein the lower line again applies only in the symplectic case. The coefficients $\bar{b}_{pk}$ arise via the coefficients $\bar{c}_{ik}$ as a result of the transformations H, $H^{-1}$ and can be ascribed to these, as is shown in the following Table 5.

TABLE 5

| | | | | | | Coefficient $\overline{b}_{pk} \equiv \overline{b}_{p,(k_1,k^*)}$ | | |
|---|---|---|---|---|---|---|---|---|
| Ord | Indices | | Pre-factor | Aberra-tions | Sym- | | Simple propa-gation dis-tance | Refraction at single |
| p | $k_1$ | $k^*$ | | Term | bol | General case | $\tau/n$ | surface ($\beta = 1$) |
| 2 | 0 | 0 | 1 | 1 | $\overline{b}_{2,0}$ | $-C$ | 0 | $(n'-n)\overline{z}^{(2)}$ |
| 2 | 1 | 0 | 1 | $E_2$ | $\overline{b}_{2,1}$ | $D$ | 1 | 1 |
| 3 | 0 | 0 | 1 | 1 | $\overline{b}_{3,0}$ | $-\overline{c}_{2,0} = -T_{AC}^{(2,0)}$ | 0 | $(n'-n)\overline{z}^{(3)}$ |
| 3 | 1 | 0 | 1 | $E_2$ | $\overline{b}_{3,1}$ | $+\overline{c}_{2,1} = 2T_{AC}^{(1,1)} + T_{BD}^{(2,0)}$ | 0 | 0 |
| 3 | 2 | 0 | 1 | $E_2^2$ | $\overline{b}_{3,2}$ | $-\overline{c}_{2,2} = -X(\overline{c}_{2,1}) = -\left(T_{AC}^{(0,2)} + 2T_{BD}^{(1,1)}\right)$ | 0 | 0 |
| 3 | 3 | 0 | 1 | $E_2^2$ | $\overline{b}_{3,3}$ | $+\overline{c}_{2,3} = X(\overline{c}_{2,0}) = T_{BD}^{(0,2)}$ | 0 | 0 |
| 3 | 0 | 1 | 1 | $E_3$ | $\overline{b}_{3,01}$ | 1 | 1 | 1 |
| 4 | 0 | 0 | $\beta$ | 1 | $\overline{b}_{4,0}$ | $-\overline{c}_{3,0} - 3A^2C^3/n'^2$ | 0 | $(n'-n)\left(\overline{z}^{(4)} - 6n(n'-n)/n'^2\overline{z}^{(2)^3}\right)$ |
| 4 | 1 | 0 | $\beta$ | $E_2$ | $\overline{b}_{4,1}$ | $+\overline{c}_{3,1} + 3AC^2(2BC + 3AD)/n'^2$ | 0 | $6(n'-n)(n'-3n)/n'^2\overline{z}^{(2)^2}$ |
| 4 | 2 | 0 | $\beta$ | $E_2^2$ | $\overline{b}_{4,2}$ | $-\overline{c}_{3,2} - 3C(B^2C^2 + 6ABCD + 3A^2D^2)/n'^2$ | 0 | $6(n'-n)(n'+3n)/(nn'^2)\overline{z}^{(2)}$ |
| 4 | 3 | 0 | $\beta$ | $E_2^2$ | $\overline{b}_{4,3}$ | $+\overline{c}_{3,3} - 3A/n^2 + 3D(3B^2C^2 + 6ABCD + A^2D^2)/n'^2$ | 0 | $-6(n'-n)(n'+n)/(n^2n'^2)$ |
| 4 | 4 | 0 | $\beta$ | $E_2^4$ | $\overline{b}_{4,4}$ | $-\overline{c}_{3,4} + 3B/n^2 - 3BD^2(3BC + 2AD)/n'^2$ | $-3\tau/n^4$ | 0 |
| 4 | 5 | 0 | $\beta$ | $E_2^5$ | $\overline{b}_{4,5}$ | $+\overline{c}_{3,5} + 3B^2D^3/n'^2$ | $3\tau^2/n^6$ | 0 |
| 4 | 0 | 1 | $\beta$ | $E_3$ | $\overline{b}_{4,01}$ | $+\overline{c}_{3,01}$ | 0 | 0 |
| 4 | 1 | 1 | $\beta$ | $E_2E_3$ | $\overline{b}_{4,11}$ | $-\overline{c}_{3,11}$ | 0 | 0 |
| 4 | 2 | 1 | $\beta$ | $E_2^2E_3$ | $\overline{b}_{4,21}$ | $+\overline{c}_{3,21}$ | 0 | 0 |
| 4 | 0 | 2 | $\beta$ | $E_3^2$ | $\overline{b}_{4,02}$ | $-\overline{c}_{3,02} = 3B$ | $3\tau/n^3$ | 0 |
| 4 | 0 | 01 | $\beta$ | $E_4$ | $\overline{b}_{4,001}$ | 1 | 1 | 1 |
| 5 | 0 | 0 | $\beta^2$ | 1 | $\overline{b}_{5,0}$ | $-\overline{c}_{4,0} - 22A^2C^2T_{AC}^{(2,0)}/n'^2$ | 0 | $(n'-n)\begin{pmatrix}\overline{z}^{(5)} - 40n\times \\ (n'-n)/n'^2\overline{z}^{(2)^2}\overline{z}^{(3)}\end{pmatrix}$ |
| 5 | 1 | 0 | $\beta^2$ | $E_2$ | $\overline{b}_{5,1}$ | $+\overline{c}_{4,1} + 22AC\left(2(AD+BC)T_{AC}^{(2,0)} + AC\left(2T_{AC}^{(1,1)} + T_{BD}^{(2,0)}\right)\right)/n'^2$ | 0 | $10(n'-n)(3n'-8n)/n'^2\overline{z}^{(2)}\overline{z}^{(3)}$ |
| 5 | 2 | 0 | $\beta^2$ | $E_2^2$ | $\overline{b}_{5,2}$ | $-\overline{c}_{4,2} - $ $22\begin{pmatrix}\left(A^2D^2 + 6ABCD + B^2C^2\right)T_{AC}^{(2,0)} + AC\times \\ \left(4(AD+BC)T_{AC}^{(1,1)} + AC\left(T_{AC}^{(0,2)} + 2T_{BD}^{(1,1)}\right) - \right) \\ BCT_{BD}^{(2,0)} - 2Df_x^{(2,0)}\end{pmatrix}/n'^2$ | 0 | $10(n'-n)(n'+4n)/(nn'^2)\overline{z}^{(3)}$ |
| 5 | 3 | 0 | $\beta^2$ | $E_2^3$ | $\overline{b}_{5,3}$ | $-\overline{c}_{4,3} + $ $22\begin{pmatrix}2ABD^2T_{AC}^{(2,0)} + AC\times \\ \left(2BC\left(T_{AC}^{(0,2)} + 2T_{BD}^{(1,1)}\right) + A\left(2DT_{AC}^{(0,2)} + CT_{BD}^{(0,2)}\right)\right) + \\ \left(A^2D^2 + 6ABCD + B^2C^2\right)\left(2T_{AC}^{(1,1)} + T_{BD}^{(2,0)}\right)\end{pmatrix}/n'^2 + $ $6A\left(2BT_{AC}^{(2,0)} - 2AT_{AC}^{(1,1)} + 3f_x^{(2,0)}\right)/n^2$ | 0 | 0 |
| 5 | 4 | 0 | $\beta^2$ | $E_2^4$ | $\overline{b}_{5,4}$ | $-\overline{c}_{4,4} - $ $+6\begin{pmatrix}4B^2T_{AC}^{(2,0)} - 2A^2\left(T_{AC}^{(0,2)} + T_{BD}^{(1,1)}\right) + \\ 6Af_x^{(1,1)} + Bf_x^{(2,0)}\end{pmatrix}/n^2$ | 0 | 0 |
| 5 | 5 | 0 | $\beta^2$ | $E_2^5$ | $\overline{b}_{5,5}$ | $+\overline{c}_{4,5} + $ $22\begin{pmatrix}\left(A^2D^2 + 6ABCD + B^2C^2\right)T_{BD}^{(0,2)} + BD\times \\ \left(BD\left(6T_{AC}^{(1,1)} + T_{BD}^{(2,0)}\right) + 2ADT_{AC}^{(0,2)} + 4BCT_{BD}^{(1,1)} + \right) \\ 2\left(Cf_x^{(0,2)} - 2DBf_x^{(1,1)}\right)\end{pmatrix}/n'^2 + $ | 0 | 0 |

TABLE 5-continued

| | | | Pre- | Aberra- | Sym- | | Simple propagation distance | Refraction at single |
|---|---|---|---|---|---|---|---|---|
| Ord | Indices | | factor | tions | | Coefficient $\overline{b}_{pk} = \overline{b}_{p,(k_1,k^*)}$ | | |
| p | $k_1$ | $k^*$ | | Term | bol | General case | $\tau/n$ | surface ($\beta = 1$) |
| 5 | 6 | 0 | $\beta^2$ | $E_2{}^6$ | $\overline{b}_{5,6}$ | $6\left(\dfrac{4A^2 T_{BD}^{(0,2)} - 2B^2\left(T_{AC}^{(1,1)} + T_{BD}^{(2,0)}\right) -}{Af_x^{(0,2)} - 6Bf_x^{(1,1)}}\right)/n^2$ $-\overline{c}_{4,6}-$ $22BD\left(B\left(3DT_{AC}^{(0,2)} + 2DT_{BD}^{(1,1)} + 2CT_{BD}^{(0,2)}\right) - 2Df_x^{(0,2)}\right)/n'^2 +$ $6B\left(2BT_{BD}^{(1,1)} - 2AT_{BD}^{(0,2)}\right) + 3f_x^{(0,2)}\right)/n^2$ | 0 | 0 |
| 5 | 7 | 0 | $\beta^2$ | $E_2{}^7$ | $\overline{b}_{5,7}$ | $+\overline{c}_{47} + 22B^2D^2 T_{BD}^{(0,2)}/n'^2$ | 0 | 0 |
| 5 | 0 | 1 | $\beta^2$ | $E_3$ | $\overline{b}_{5,01}$ | $+\overline{c}_{4,11} + 22A^2C^2/n'^2$ | 0 | $10(n'-n)(n'-4n)/(nn'^2)\,\overline{z}^{(2)2}$ |
| 5 | 1 | 1 | $\beta^2$ | $E_2E_3$ | $\overline{b}_{5,11}$ | $-\overline{c}_{4,11} - 44AC(AD+BC)/n'^2$ | 0 | $10(n'-n)(3n'+8n)/(nn'^2)\overline{z}^{(2)}$ |
| 5 | 2 | 1 | $\beta^2$ | $E_2{}^2E_3$ | $\overline{b}_{5,21}$ | $+\overline{c}_{4,21} + 22((A^2D^2 + 4ABCD + B^2C^2)/n'^2 - A^2)/n^2)$ | 0 | $-40(n'-n)(n'+n)/n^2n'^2)$ |
| 5 | 3 | 1 | $\beta^2$ | $E_2{}^3E_3$ | $\overline{b}_{5,31}$ | $-\overline{c}_{4,31} + 2B(22D(AD+BC)/n'^2 + 7A/n^2)$ | 0 | 0 |
| 5 | 4 | 1 | $\beta^2$ | $E_2{}^4E_3$ | $\overline{b}_{5,41}$ | $+\overline{c}_{4,41} + 2B^2(11D^2/n'^2 + 4/n^2)$ | 0 | 0 |
| 5 | 0 | 2 | $\beta^2$ | $E_3{}^2$ | $\overline{b}_{5,02}$ | $-\overline{c}_{4,02}$ | 0 | 0 |
| 5 | 1 | 2 | $\beta^2$ | $E_2E_3{}^2$ | $\overline{b}_{5,12}$ | $+\overline{c}_{4,12}$ | 0 | 0 |
| 5 | 2 | 2 | $\beta^2$ | $E_2{}^2E_3{}^2$ | $\overline{b}_{5,22}$ | $-\overline{c}_{4,22}$ | 0 | 0 |
| 5 | 0 | 01 | $\beta$ | $E_4$ | $\overline{b}_{5,001}$ | $+\overline{c}_{4,001}$ | 0 | 0 |
| 5 | 1 | 01 | $\beta$ | $E_2E_4$ | $\overline{b}_{5,101}$ | $-\overline{c}_{4,101}$ | 0 | 0 |
| 5 | 2 | 01 | $\beta$ | $E_2{}^2E_4$ | $\overline{b}_{5,201}$ | $+\overline{c}_{4,201}$ | 0 | 0 |
| 5 | 0 | 3 | $\beta^2$ | $E_3{}^3$ | $\overline{b}_{5,03}$ | $15B^2$ | $15\tau^2/n^4$ | 0 |
| 5 | 0 | 11 | $\beta$ | $E_3E_4$ | $\overline{b}_{5,011}$ | $-10B$ | $-10\tau/n^2$ | 0 |
| 5 | 0 | 001 | 1 | $E_5\overline{b}_{5,0001}$ | 1 | 1 | 1 | |
| 6 | 0 | 0 | $\beta^2$ | 1 | $\overline{b}_{6,0}$ | $\ldots$ | 0 | $(n'-n)\times$ $\left(\begin{matrix} z^{(6)} + (\ldots\ )z^{(2)5} + \\ (\ldots\ )z^{(2)2}z^{(4)} + (\ldots\ )z^{(2)}z^{(2)3} \end{matrix}\right)$ |
| . | . | . . | . | . . | . | | . | . |
| . | . | . . | . | . . | . | | . | . |
| 6 | 0 | 0 1 | | $\overline{b}_{6,00001}$ | 1 | 1 | 1 | . |
| 7 | 0 | 0 | $\beta^4$ | 1 | $\overline{b}_{7,0}$ | | 0 | $\ldots$ |

Exemplary Embodiment

A simple exemplary embodiment is the passage of light through a meridian of an eye model by Bennett and Rabbetts, i.e. a modified Gullstrand-Emsley eye (mGE eye), that is adapted to biometric studies (see R. Rabetts, "Bennett & Rabbetts' Clinical Visual Optics," Butterworth Heinemann Elsevier Health Sciences, 2007, ISBN: 9780750688741). The eyeball contains a cornea with index of refraction $S_C$ as well as an eye lens with indices of refraction $L_1$ and $L_2$ at anterior or posterior surface. The curvature radii of the cornea and of the two lens surfaces are $r_C$, $r_1$, or $r_2$. The distance between cornea and anterior lens surface is given by the anterior chamber depth $d_{CL}$; the lens thickness is given by $d_L$, and the vitreous body depth is given by $d_{LR}$. The indices of refraction of the chamber fluid is $n_{CL}$, that of the eye lens is $n_L$, and that of the vitreous body is $n_{LR}$. According to the prior art, the following values are typical for the biometric parameters:

$$d_{CL} = 3.6 \text{ mm}, \tag{39}$$

$$d_L = 3.7 \text{ mm},$$

$$d_{LR} = 16.7859082 \text{ mm},$$

$$r_C = 7.8 \text{ mm},$$

$$r_1 = 11.0 \text{ mm},$$

$$r_2 = -6.47515 \text{ mm},$$

$$n_{CL} = 1.336$$

$$n_L = 1.422$$

$$n_{LR} = 1.336$$

$$z_C^{(2)} = 1/r_C = 128.2051282 \text{ m}^{-1}, \; S_C = (n_{CL} - 1)z_C^{(2)} = 43.076923 \text{ dpt}$$

-continued $$z_{L1}^{(2)} = 1/r_1 = 90.9090909 \text{ m}^{-1}, L_1 = (n_L - n_{CL})z_{L1}^{(2)} = 7.81818181 \text{ dpt}$$

$$z_{L2}^{(2)} = 1/r_2 = -154.436576 \text{ m}^{-1}, L_2 = (n_{LR} - n_L)z_{L2}^{(2)} = 13.28154560 \text{ dpt}$$

In Eq. (39), none of the values with more than three decimal places originates from a direct measurement, but rather from consistency observations with which the model is exactly emmetropic, meaning that a plane wavefront must be mapped to a spherical wave that converges precisely on the retina.

Since both the Gullstrand-Emsley eye and the Bennett-Rabbetts eye are paraxial according to the prior art, and therefore specified only to second-order wavefront aberrations, these models are not immediately suitable as an exemplary embodiment for the calculation of higher-order aberrations as long as no suitable specification for the HOA is supplemented here. For the purpose of the present exemplary embodiment, the property of the emmetropic eye should also be maintained for HOAs. The two lens surfaces, also including the HOAs, are preferably exact spherical surfaces, by contrast to which the HOAs of the cornea must then be selected so that the eye satisfies the above emmetropia requirement.

The odd derivatives of the function $\bar{z}(x)$ disappear for each spherical surface, by contrast to which the even derivatives are uniquely determined by the curvature $\bar{z}^{(2)}$ in the form of $$\bar{z}^{(4)} = 3(\bar{z}^{(2)})^3, \bar{z}^{(6)} = 45(\bar{z}^{(2)})^5 \tag{40}$$

Numerically, for four additional biometric parameters that means $$z_{L1}^{(4)} = 2.25394 \times 10^6 \text{ m}^{-3}, z_{L1}^{(6)} = 2.794145 \times 10^{11} \text{ m}^{-5} \tag{41}$$

$$z_{L2}^{(4)} = -1.105024 \times 10^7 \text{ m}^{-3}, z_{L2}^{(6)} = -3.95333 \times 10^{12} \text{ m}^{-5}$$

The method according to the invention can now be utilized in order to select the higher orders $\bar{z}_C^{(4)}$, $\bar{z}_C^{(6)}$ of the cornea so that the wavefront that appears after the refraction at the posterior lens surface converges precisely on the retina, thus is precisely a spherical wave with radius $d_{LR}$. The criterion is that an incident plane wave $w^{(k)}=0$ leads to the emergent derivatives $$w'^{(4)} = 3\left(w'^{(2)}\right)^3, w'^{(6)} = 45\left(w'^{(2)}\right)^5 \tag{42}$$

analogous to Eq. (40). Aberrations $E'_p = n'w'^{(p)}$ are a particularly preferred alternative to derivatives $w'^{(p)}$ as a description of wavefronts, thus $$E'_4/n' = 3\left(E'_2/n'\right)^3, E'_6/n' = 45\left(E'_2/n'\right)^5 \tag{43}$$

$$E'_4 = 3n_{LR}^{-2}E_2'^3, E'_6 = 45n_{LR}^{-4}E_2'^5$$

in the event of a spherical wave, wherein $n'=n_{LR}$. On the other hand, via Eq. (38) and Eq. (36) the aberrations $E'_2$, $E'_4$, $E'_6$ result depending on the optical system, and an incident plane wave means that the aberrations $E_p=0$ are for all orders p. For every order p, only the least coefficient $\bar{b}_{pk}$ for k=0 thus contributes:

$$E'_2 = \beta \bar{b}_{2,0}, E'_4 = \beta^4 \beta \bar{b}_{4,0}, E'_6 = \beta^6 \beta^3 \bar{b}_{6,0} \tag{44}$$

wherein $\bar{b}_{2,0}=-C$ is from Table 5, and wherein $\bar{b}_{4,0}$ is furthermore a function of the parameter $\bar{z}_C^{(4)}$ to be determined, and wherein $\bar{b}_{6,0}$ is a function of both of the parameters $\bar{z}_C^{(4)}$, $\bar{z}_C^{(6)}$ to be determined. By inserting Eq. (44) into Eq. (43), the requirement $$\bar{b}_{4,0} = 3(\beta n_{LR})^{-2} \bar{b}_{2,0}^3, \bar{b}_{6,0} = 45(\beta n_{LR})^{-4} \bar{b}_{2,0}^5 \tag{45}$$

results.

Inserting all known numerical values in Table 5 leads to the coefficients $$\bar{b}_{4,0}(z_C^{(4)}) = 2.11526 \times 10^5 \text{ m}^{-3} + 0.253296 z_C^{(4)} \tag{46}$$

$$\bar{b}_{6,0}(z_C^{(4)}, z_C^{(6)}) = 2.204136 \times 10^{11} \text{ m}^{-5} -$$

$$3.36879 \times 10^4 \text{ m}^{-2} z_C^{(4)} + 3.36306 \text{ m}(z_C^{(4)})^2 + 0.143949 z_{z_C}^{(6)}$$

wherein, according to Eq. (37), $\beta$ for $E_2=0$ reduces to $\beta=A^{-1}$, and the values for A and C are determined with the aid of Eq. (49).

Equations (46) are solved by $$z_C^{(4)} = -2.05536 \times 10^4 \text{ m}^{-3}, z_C^{(6)} = -1.51137 \times 10^{12} \text{ m}^{-5} \tag{47}$$

so that, together with Eq. (41) and Eq. (39), all 6th-order biometric parameters of the mGE eye are determined. The manner of how Eq. (47) comes about shows the technical advantages of the invention. Even if the same result can also be obtained via repeated application of the method known from the prior art, the way via the coefficients $\bar{b}_{4,0}$, $\bar{b}_{6,0}$ is more direct and suitable to represent the dependency on the parameters $\bar{z}_C^{(4)}$, $\bar{z}_C^{(6)}$, while the influence of all other refractions and propagations at this moment is already incorporated and pre-evaluated.

All derivatives of the participating ray transfer functions up to the order p=6 are summarized on the basis of the parameter values. All derivatives of the ray transfer functions of the refracting components of the mGE eye are shown in the following Table 6; those for propagations are shown in Table 7, and those of the entire mGE eye are shown in Table 8. The derivatives of the ray transfer functions $f^{C,ref}$, $f^{L1,ref}$, $f^{L2,ref}$ of the refractions can be determined via insertions using Table 3; those of the ray transfer functions $f^{e,prop}$, $f^{dCL,prop}$, $f^{dl,prop}$ of the propagations can be determined using Table 1. Since the mGE eye is symmetrical, these derivatives vanish for odd orders p (i.e., for even values of the sum $n_x+n_r$ of the orders of the derivatives), such that Tables 6, 7, and 8 have only entries for even orders.

TABLE 6

Derivatives of the ray transfer functions $f^{C,ref}$, $f^{L1,ref}$, $f^{L2,ref}$ of the refractions of the components of the eye

| Order | | | Cornea $S_C$ | | Anterior lens surface $L_1$ |
| --- | --- | --- | --- | --- | --- |
| p | $n_x$ | $n_t$ | $f_x^{C,ref\,(n_x,n_t)}$ | $f_t^{C,ref\,(n_x,n_t)}$ | $f_x^{L1,ref\,(n_x,n_t)}$ |
| 2 | 1 | 0 | 1 | −43.0769 dpt | 1 |
| 2 | 0 | 1 | 0 | 1 | 0 |
| 4 | 3 | 0 | 12401.2 m$^{-2}$ | 4.067615 * 10$^5$ m$^{-3}$ | 1499.46 m$^{-2}$ |
| 4 | 2 | 1 | 32.2432 m$^{-1}$ | −10671.29 m$^{-2}$ | 4.11528 m$^{-1}$ |
| 4 | 1 | 2 | 0 | −104.645 m$^{-1}$ | 0 |
| 4 | 0 | 3 | 0 | −1.31923 | 0 |
| 6 | 5 | 0 | −3.93649 * 10$^8$ m$^{-4}$ | 4.80357 * 10$^{11}$ m$^{-5}$ | 1.78842 * 10$^8$ m$^{-4}$ |
| 6 | 4 | 1 | 1.24986 * 10$^7$ m$^{-3}$ | 6.19886 * 10$^8$ m$^{-4}$ | 1.06288 * 10$^6$ m$^{-3}$ |
| 6 | 3 | 2 | 5.49284 * 10$^4$ m$^{-2}$ | −8.19587 * 10$^6$ m$^{-3}$ | 4694.07 m$^{-2}$ |
| 6 | 2 | 3 | 126.595 m$^{-1}$ | −5.87327 * 10$^4$ m$^{-2}$ | 12.604 m$^{-1}$ |
| 6 | 1 | 4 | 0 | 98.8023 m$^{-1}$ | 0 |
| 6 | 0 | 5 | 0 | 8.70184 | 0 |

| Order | | | Anterior lens surface $L_1$ | Posterior lens surface $L_2$ | |
| --- | --- | --- | --- | --- | --- |
| p | $n_x$ | $n_t$ | $f_t^{L1,ref\,(n_x,n_t)}$ | $f_x^{L2,ref\,(n_x,n_t)}$ | $f_t^{L2,ref\,(n_x,n_t)}$ |
| 2 | 1 | 0 | −7.81818 dpt | 1 | −13.2815 dpt |
| 2 | 0 | 1 | 1 | 0 | 1 |
| 4 | 3 | 0 | −1.82825 * 10$^5$ m$^{-3}$ | −4605.89 m$^{-2}$ | −1.01543 * 10$^6$ m$^{-3}$ |
| 4 | 2 | 1 | −1440.95 m$^{-2}$ | 6.99105 m$^{-1}$ | 4809.53 m$^{-2}$ |
| 4 | 1 | 2 | −15.7145 m$^{-1}$ | 0 | −29.3143 m$^{-1}$ |
| 4 | 0 | 3 | −0.197152 | 0 | 0.197152 |
| 6 | 5 | 0 | −2.14040 * 10$^{10}$ m$^{-5}$ | −1.72307 * 10$^9$ m$^{-4}$ | −3.88671 * 10$^{11}$ m$^{-5}$ |
| 6 | 4 | 1 | −1.70212 * 10$^8$ m$^{-4}$ | 5.83689 * 10$^6$ m$^{-3}$ | 1.82661 * 10$^9$ m$^{-4}$ |
| 6 | 3 | 2 | −1.25104 * 10$^6$ m$^{-3}$ | −14721.4 m$^{-2}$ | −8.08185 * 10$^6$ m$^{-3}$ |
| 6 | 2 | 3 | −8231.94 m$^{-2}$ | 22.7901 m$^{-1}$ | 33476.3 m$^{-2}$ |
| 6 | 1 | 4 | −36.5481 m$^{-1}$ | 0 | −117.301 m$^{-1}$ |
| 6 | 0 | 5 | 0.194345 | 0 | 0.194345 |

TABLE 7

Derivatives of the ray transfer functions $f^{e,prop}$, $f^{dCL,prop}$, $f^{dL,prop}$ of the propagations of the components of the eye

| Order | | | Corneal vertex distance e | | Anterior chamber depth $d_{CL}$ | | Lens thickness $d_L$ | |
| --- | --- | --- | --- | --- | --- | --- | --- | --- |
| p | $n_x$ | $n_t$ | $f_x^{e,prop(n_x,n_t)}$ | $f_t^{e,prop(n_x,n_t)}$ | $f_x^{dCL,prop(n_x,n_t)}$ | $f_t^{dCL,prop(n_x,n_t)}$ | $f_x^{dL,prop(n_x,n_t)}$ | $f_t^{dL,prop(n_x,n_t)}$ |
| 2 | 1 | 0 | 1 | 0 | 1 | 0 | 1 | 0 |
| 2 | 0 | 1 | 0.013 m | 1 | 2.69461 * 10$^{-3}$ m | 1 | 2.60197 * 10$^{-3}$ m | 1 |

All higher orders vanish

The derivatives of the per-component ray transfer functions $\beta^{C,ref}$, $f^{L1,ref}$, $f^{L2,ref}$, $f^{e,prop}$, $f^{dCL,prop}$, $f^{dL,prop}$ within the mGE eye are the starting point in order to determine the total ray transfer function $f^{mGE}$ of the entire mGE eye. Since $f^{mGE}$ is defined as a chaining $$f^{mGE}(\rho) = f^{L2,ref}\left(f^{dL,prop}\left(f^{L1,ref}\left(f^{dCL,prop}\left(f^{C,ref}(\rho)\right)\right)\right)\right) \quad (48)$$

all derivatives of $f^{mGE}$ up to the order p=6 are determined, with the aid of the chain rule, from the derivatives of the per-component ray transfer functions.

TABLE 8

Derivatives of the ray transfer function $f^{mGE}$ of the modified Gullstrand-Emsley eye

| Order | | | mod. Gullstrand-Emsley eye | |
| --- | --- | --- | --- | --- |
| p | $n_x$ | $n_t$ | $f_x^{mGE(n_x,n_t)}$ | $f_x^{mGE(n_x,n_t)}$ |
| 2 | 1 | 0 | 0.753858 | −60.00001 dpt |
| 2 | 0 | 1 | 5.24176*10$^{-3}$ m | 0.909314 |
| 4 | 3 | 0 | 12221.93 m$^{-2}$ | −9.72751*10$^5$ m$^{-3}$ |
| 4 | 2 | 1 | −32.6185 m$^{-1}$ | −10883.5 m$^{-2}$ |
| 4 | 1 | 2 | −0.595797 | −110.553 m$^{-1}$ |
| 4 | 0 | 3 | −7.82984*10$^{-3}$ m | −1.56287 |

53

TABLE 8-continued

Derivatives of the ray transfer function
$f^{mGE}$ of the modified Gullstrand-Emsley eye

| Order | | | mod. Gullstrand-Emsley eye | |
|---|---|---|---|---|
| p | $n_x$ | $n_t$ | $f_x^{mGE(n_x,n_t)}$ | $f_x^{mGE(n_x,n_t)}$ |
| 6 | 5 | 0 | $7.24284*10^8$ m$^{-4}$ | $-5.76462*10^{10}$ m$^{-5}$ |
| 6 | 4 | 1 | $1.20722*10^7$ m$^{-3}$ | $-3.549999*10^8$ m$^{-4}$ |
| 6 | 3 | 2 | $10955.5*10^4$ m$^{-2}$ | $-8.559098*10^6$ m$^{-3}$ |
| 6 | 2 | 3 | $-88.57369$ m$^{-1}$ | $-4.62591*10^4$ m$^{-2}$ |
| 6 | 1 | 4 | $1.407511$ | $271.8149$ m$^{-1}$ |
| 6 | 0 | 5 | $0.056790$ m | $11.548181$ |

The prefactor $\beta$ and the wavefront transfer functions $\overline{b}_{pk}$ of the mGE eye, which are required to evaluate the wavefront calculation in Eq. (38), (36), can now in turn be determined from the derivatives of the ray transfer function.

According to Eq. (4), it applies that:

$$T = \begin{pmatrix} A & B \\ C & D \end{pmatrix} = \begin{pmatrix} 0.753858 & 0.00524176 \text{ m} \\ -60.00001 \text{ dpt} & 0.909314 \end{pmatrix} \quad (49)$$

Moreover, the prefactor $\beta$ according to Eq. (26) is specific to the incident wavefront $t^{(1)}=-w^{(2)}=-nE_2=E_2$, wherein Eq. (8) and the definition $E_p=nw^{(p)}$ can be utilized, as well as the fact that the index of refraction in the space before the eye is provided by $n=1$. The prefactor $\beta$ can then be determined from $E_2$ according to Eq. (37) with the aid of [sic] from Eq. (49).

The determination of the wavefront transfer coefficients $\overline{b}_{pk}$ can finally be performed by insertion of the numerical values of the derivatives of the ray transfer function from Table 8 into Table 5. The result is presented in the following Table 9.

TABLE 9

Wavefront transfer coefficients $\overline{b}_{pk}$ for the modified Gullstrand-Emsley eye

| Indices | | Wavefront order p | | | | |
|---|---|---|---|---|---|---|
| k* | $k_1$ | 2 | 3 | 4 | 5 | 6 |
| (0) | 0 | 60.0000 dpt | 0 | $2.06320*10^5$ m$^{-3}$ | 0 | $3.54733*10^9$ m$^{-5}$ |
| | 1 | 0.909314 | 0 | $-28692.2$ m$^{-2}$ | 0 | $2.16457*10^9$ m$^{-4}$ |
| | 2 | | 0 | $597.737$ m$^{-1}$ | 0 | $-7.52551*10^6$ m$^{-3}$ |
| | 3 | | 0 | $-6.69794$ | 0 | $-1.03962*10^6$ m$^{-2}$ |
| | 4 | | | $2.26513*10^{-2}$ m | 0 | $23021.1$ m$^{-1}$ |
| | 5 | | | $2.91006*10^{-5}$ m$^2$ | 0 | $-237.259$ |
| | 6 | | | | 0 | $1.70495$ m |
| | 7 | | | | 0 | $-0.009055$ m$^2$ |
| | 8 | | | | | $2.21606*10^{-5}$ m$^3$ |
| | 9 | | | | | $2.38306*10^{-9}$ m$^4$ |
| (1) | 0 | | 1 | 0 | $-46287.1$ m$^{-2}$ | 0 |
| | 1 | | | 0 | $655.057$ m$^{-1}$ | 0 |
| | 2 | | | 0 | $-10.7069$ | 0 |
| | 3 | | | | $-0.0343949$ m | 0 |
| | 4 | | | | $6.44793*10^{-4}$ m$^2$ | 0 |
| | 5 | | | | | 0 |
| | 6 | | | | | 0 |
| (2) | 0 | | | $0.0157253$ m | 0 | $-2547.464$ m$^{-1}$ |
| | 1 | | | | 0 | $16.42902$ |
| | 2 | | | | 0 | $-0.607000$ m |
| | 3 | | | | | $0.00119945$ m$^2$ |
| | 4 | | | | | $-98305.4$ m$^4$ |
| (0, 1) | 0 | | | 1 | 0 | $1216.102$ m$^5$ |
| | 1 | | | | 0 | $-17.7499$ m$^6$ |
| | 2 | | | | 0 | $-0.0983983$ m$^7$ |
| | 3 | | | | | $0.00136332$ m$^8$ |
| | 4 | | | | | $-98305.4$ m$^4$ |
| (3) | 0 | | | | $4.12141*10^{-4}$ m$^2$ | 0 |
| | 1 | | | | | 0 |
| | 2 | | | | | 0 |
| (1, 1) | 0 | | | | $0.0524176$ m | 0 |
| | 1 | | | | | 0 |
| | 2 | | | | | 0 |
| (0, 0, 1) | 0 | | | | 1 | 0 |
| | 1 | | | | | 0 |
| | 2 | | | | | 0 |
| (4) | 0 | | | | | $1.51224*10^{-5}$ m$^3$ |
| (2, 1) | 0 | | | | | $0.00288499$ m$^2$ |
| (0, 2) | 0 | | | | | $0.0524176$ m |
| (1, 0, 1) | 0 | | | | | $0.0786265$ m |
| (0, 0, 0, 1) | 0 | | | | | 1 |

The actual goal, namely the repeated calculation of various wavefronts through the mGE eye, can now be achieved on the basis of the values from Eq. (49) and from Table 9.

The results for $E'_p$ are shown in the following Table 10 for the orders $p \leq 6$. In the first column are the results for a plane incident wavefront that is mapped to a spherical wave after construction of the emmetropic mGE eye. The second and third column relate to an incident wavefront from 40 cm distance, wherein the third column corresponds to an exact spherical wave and the second column corresponds to a second-order approximation of this spherical wave. Finally, the fourth column shows a randomly selected wavefront whose HOAs are chosen by way of example.

TABLE 10

Aberrations $E'_2$, $E'_3$, $E'_4$, $E'_5$, $E'_6$ of the emergent wavefront after the wavefront calculation of various wavefronts with aberrations $E_2$, $E_3$, $E_4$, $E_5$, $E_6$ through the modified Gullstrand-Emsley eye

| | Aberrations and prefactor | Plane wavefront | Wavefront from 40 cm distance | | Random wavefront with HOA |
| | | | 2nd order wavefront (parabola) | Spherical wave | |
|---|---|---|---|---|---|
| Input | $E_2$ | 0 | $-2.5$ dpt | $-2.5$ dpt | $-2.5$ dpt |
| | $E_3$ | 0 | 0 | 0 | $-1.0*10^3$ $m^{-2}$ |
| | $E_4$ | 0 | 0 | $-46.875$ $m^{-3}$ | $7.0*10^5$ $m^{-3}$ |
| | $E_5$ | 0 | 0 | 0 | $-2.0*10^8$ $m^{-4}$ |
| | $E_6$ | 0 | 0 | $-4.39453*10^3$ $m^{-5}$ | $5.0*10^{10}$ $m^{-5}$ |
| Output | $\beta$ | 1.32651 | 1.26348 | 1.26348 | 1.26348 |
| | $E'_2$ | 79.5906 dpt | 75.4005 dpt | 75.4005 dpt | 75.4005 dpt |
| | $E'_3$ | 0 | 0 | 0 | $-1.50974*10^3$ $m^{-2}$ |
| | $E'_4$ | $8.47409*10^5$ $m^{-3}$ | $1.05563*10^6$ $m^{-3}$ | $1.05551*10^6$ $m^{-3}$ | $2.98485*10^6$ $m^{-3}$ |
| | $E'_5$ | 0 | 0 | 0 | $-8.09790*10^8$ $m^{-4}$ |
| | $E'_6$ | $4.51123*10^{10}$ $m^{-5}$ | $-1.88462*10^{10}$ $m^{-5}$ | $-1.88111*10^{10}$ $m^{-5}$ | $3.31012*10^{11}$ $m^{-3}$ |

The method according to the invention can preferably be used to optimize spectacle lenses, wherein then the actual biometric parameters of the individual eye are to be used instead of the mGE eye, and the input wavefront for the calculation is preferably a second-order wavefront that originates from the spectacle lens to be optimized. The spectacle lens is thereby to be determined so that, with regard to a metric, the output wavefront optimally approximates the spherical wave that converges on the retina.

The invention claimed is:

1. A method for simulating a complex optical system using a wavefront calculation, wherein an effect of the complex optical system exceeds a single refraction, a single propagation, or a single reflection, the method comprising:

setting up at least one wavefront transfer function for the optical system, wherein the wavefront transfer function is designed to assign a respective associated emergent wavefront to wavefronts entering into the optical system, taking into account imaging errors with an order greater than the order of defocus; and evaluating the at least one wavefront transfer function for at least one wavefront entering into the optical system.

2. The method according to claim 1, wherein the method is a method for optimizing a total optical system, wherein the optical system represents a second partial system of the total optical system, and the total optical system additionally comprises a first partial system, wherein in particular the first partial system and/or the second partial system can be varied during the optimization.

3. The method according to claim 2, wherein the first partial system is a spectacle lens and the second partial system is a model eye.

4. The method according to claim 2, wherein:

the at least one wavefront entering into the optical system is determined based on a predetermined test wavefront which passes through the first partial system.

5. The method according to claim 2, further comprising:

assessing the total optical system based on a result of the evaluation of the at least one wavefront transfer function for the at least one wavefront entering into the optical system, wherein the total optical system is assessed under variation of the first partial system until the assessment satisfies a predetermined condition, wherein the variation of the first partial system in particular comprises a changing of at least one refracting surface and/or of at least one distance between refracting surfaces of the first partial system, and/or a tilting and/or displacement of the first partial system relative to the second partial system.

6. The method according to claim 5, wherein:

the assessment of the total optical system is performed based on the result of the evaluation of the at least one wave transfer function for a first wavefront entering into the optical system, and also based on the result of the evaluation of the at least one wave transfer function for a second incident wavefront, wherein the first partial system is located at a first position and a first orientation relative to the second partial system upon incidence of the first wavefront, wherein the first partial system is located at a second position and orientation relative to the second partial system upon incidence of the second wavefront, and wherein the first position differs from the second position and/or the first orientation differs from the second orientation.

7. The method according to claim 5, wherein the assessment of the total optical system is performed based on the result of the evaluation of a first wave transfer function for a first wavefront entering into the optical system, and also based on the result of the evaluation of a second wave transfer function for an additional incident wavefront, wherein the first partial system is located at a first position and orientation relative to the second partial system upon incidence of the first wavefront, wherein the first partial system is located at a second position and orientation relative to the second partial system upon incidence of the additional wavefront, wherein the first position differs from the second position and/or the first orientation differs from the second orientation, and wherein the second wave transfer function differs from the first wave transfer function.

8. The method according to claim 2, wherein the first partial system is a spectacle lens and the second partial system is a model eye, and wherein gaze movements of the model eye that produce a variation in a position of a piercing point of a principal ray through the spectacle lens surfaces, and/or a variation of an angle of incidence on a spectacle lens surface, are described as a variation of the position and/or of orientation of the spectacle lens in a coordinate system of the eye.

9. The method according to claim 1, wherein the optical system is a GRIN system or comprises at least one GRIN element.

10. The method according to claim 1, wherein the at least one wave transfer function has formula $$E'_p = \beta^{-\bar{r}_1^0(p-1)} \sum_{k_1,k_2,\ldots,k_{p-1}} \bar{b}_{pk}\beta^{-\Delta\bar{r}_1(p-1,k^*)}E_2^{k_1}E_3^{k_2}\ldots E_p^{k_{p-1}},$$

$$p = 2, 3, 4, \ldots$$

wherein the indices of the tuple $k=(k_1, k_2, \ldots, k_{p-1})$ run over the range $P(k^*)\leq p-2$ and $0\leq k_1\leq 2(p-P(k^*)-2)+\delta_{P(k^*),0}$, wherein $P(k^*)=\Sigma_{j=1}^{p-1}jk_{j+1}$, and wherein $-\bar{r}_1^0(p-1)=p-\delta_{(p-1),1}$ and $-\Delta\bar{r}_1(p-1, k^*)=(p-3)+\delta_{(p-1),1}-P(k^{**})$ apply, and wherein $\beta=(-BE_2+A)^{-1}$ is provided as a function of the at least one incident wavefront and of the optical system, and wherein A, B and the wavefront transfer function $\bar{b}_{pk}$ are provided as a function of the components of the optical system.

11. The method according to claim 1, wherein both incident wavefronts and emergent wavefronts are respectively represented by coefficients with regard to basic elements of a basic system whose basic elements are classified according to at least one order parameter, and wherein the at least one wave transfer function is provided in that it assigns the respective associated emergent wavefront to the wavefronts entering into the optical system in that it determines, for a basic element appearing in the representation of an emergent wavefront, the coefficients with regard to this basic element appearing in the representation of the emergent wavefront, depending on coefficients of the associated incident wavefront with regard to a plurality of those basic elements whose value of the order parameter is less than or equal to the value of the order parameter of the respective basic element appearing in the representation of the emergent wavefront.

12. The method according to claim 11, wherein the basic system is a decomposition for aberrations, wherein the order parameter is an order p of the aberrations, wherein the coefficients associated with the basic elements of the basic system are provided in that a p-th order coefficient of the incident wavefront is an aberration $E_p$ of the incident wavefront, and in that a p-th order coefficient of the associated emergent wavefront is an aberration $E'_p$ of the associated emergent wavefront, and wherein $p\geq2$.

13. The method according to claim 11, wherein the order parameter is a first order parameter, and wherein the basic elements of the basic system are additionally classified according to at least one second order parameter whose value range depends on the value of the first order parameter.

14. The method according to claim 13, wherein the basic system is a decomposition for aberrations, wherein the first order parameter is the sum of orders $p_x$ and $p_y$ of the aberrations, wherein the second order parameter is one of the orders $p_x$ and $p_y$, wherein the coefficients associated with the basic elements of the basic system are provided in that p-th order coefficients of the incident wavefront are aberrations $E_{px,py}$ of the incident wavefront, and in that p-th order coefficients of the associated emergent wavefront are aberrations $E'_{px,py}$ of the associated emergent wavefront, and wherein $p\geq2$ and $p_x\geq0$ and $p_y\geq0$.

15. The method according to claim 13, wherein the basic system is a decomposition for Taylor series of wavefront vertex depths, wherein the first order parameter is the sum p of orders $p_x$ and $p_y$ of the Taylor series of the wavefront vertex depths; wherein the second order parameter is one of the orders $p_x$ and $p_y$, wherein the coefficients associated with the basic elements of the basic system are provided in that a p-th order coefficients of the incident wavefront are Taylor series $w^{(px,py)}$ of the vertex depth of the incident wavefront, and in that the p-th order coefficients of the associated emergent wavefront are Taylor series $w'^{(px,py)}$ of the vertex depth of the associated emergent wavefront; and wherein $p\geq2$ and $p_x\geq0$ and $p_y\geq0$.

16. The method according to claim 13, wherein the basic system is a decomposition for Taylor series of a wavefront OPD, wherein the order parameter is the sum p of orders $p_x$ and $p_y$ of the Taylor series of the wavefront OPD, wherein the second order parameter is one of the orders $p_x$ and $p_y$, wherein the coefficients associated with the basic elements of the basic system are provided in that p-th order coefficients of the incident wavefront are Taylor series $OPD^{(px,py)}$ of the incident wavefront, and in that p-th order coefficients of the associated emergent wavefront are Taylor series $OPD'^{(px,py)}$ of the associated emergent wavefront, and wherein $p\geq2$ and $p_x\geq0$ and $p_y\geq0$.

17. The method according to claim 13, wherein the basic system is a decomposition for derivatives of direction functions, wherein the order parameter is the sum i of orders $i_x$ and $i_y$ of the derivatives of the direction functions, wherein the second order parameter is one of the orders $i_x$ and $i_y$, wherein the coefficients associated with the basic elements of the basic system are provided in that i-th order coefficients of the incident wavefront are derivatives $t_x^{(ix,iy)}$, $t_y^{(ix,iy)}$ of direction functions $t_x(x,y)$, $t_y(x,y)$ of the incident wavefront, and in that i-th order coefficients of the associated emergent wavefront are derivatives $t'_x^{(ix,iy)}$, $t'_y^{(ix,iy)}$ of the direction functions $t'_x(x',y')$, $t'_y(x',y')$ of the associated emergent wavefront, and wherein $i\geq1$ and $i_x\geq0$ and $i_y\geq0$.

18. The method according to claim 13, wherein the basic system is a decomposition for Zernike polynomials, wherein the first order parameter is a radial order n of the Zernike polynomials; wherein the second order parameters is an azimuthal order m of the Zernike polynomials; wherein the coefficients associated with the basic elements of the basic system are provided in that n-th order coefficients of the incident wavefront are Zernike coefficients $Z_n^m$ of the incident wavefront, and in that n-th order coefficients of the associated emergent wavefront are Zernike coefficient $Z'_n^m$ of the associated emergent wavefront; wherein $n\geq2$ and $-n\leq m\leq n$; wherein m is even for even n and odd for odd n;' and wherein the Zernike coefficients in particular relate to an established pupil.

19. The method according to claim 11, wherein the basic system is a decomposition for Taylor series of wavefront vertex depths, wherein the order parameter is an order p of the Taylor series of the wavefront vertex depths; wherein the coefficients associated with the basic elements of the basic system are provided in that a p-th order coefficient of the incident wavefront is a Taylor series $w^{(p)}$ of the vertex depth of the incident wavefront, and in that the p-th order coefficient of the associated emergent wavefront is a Taylor series $w'^{(p)}$ of the vertex depth of the associated emergent wavefront; and wherein $p \geq 2$.

20. The method according to claim 11, wherein the basic system is a decomposition for Taylor series of a wavefront OPD, wherein the order parameter is an order p of the Taylor series of the wavefront OPD, wherein the coefficients associated with the basic elements of the basic system are provided in that a p-th order coefficient of the incident wavefront is a Taylor series $OPD^{(p)}$ of the incident wavefront, and in that the p-th order coefficient of the associated emergent wavefront is a Taylor series $OPD'^{(p)}$ of the associated emergent wavefront, and wherein $p \geq 2$.

21. The method according to claim 11, wherein the basic system is a decomposition for derivatives of direction functions, wherein the order parameter is an order i of the derivatives of the direction functions, wherein the coefficients associated with the basic elements of the basic system are provided in that an i-th order coefficient of the incident wavefront is a derivative $t^{(i)}$ of a direction function t(x) of the incident wavefront, and in that an i-th order coefficient of the associated emergent wavefront is a derivative $t'^{(i)}$ of a direction function t'(x') of the associated emergent wavefront, and wherein $i \geq 1$.

22. The method according to claim 11, wherein the basic system is a decomposition for Zernike polynomials, wherein the order parameter is a radial order n of the Zernike polynomials; wherein the coefficients associated with the basic elements of the basic system are provided in that an n-th order coefficient of the incident wavefront is a Zernike coefficient $Z_n$ of the incident wavefront, and in that an n-th order coefficient of the emergent wavefront is a Zernike coefficient $Z'_n$ of the associated emergent wavefront; wherein $n \geq 2$; and wherein the Zernike coefficients in particular relate to an established pupil.

23. A non-transitory computer program product comprising computer-readable instructions which, when loaded into a memory of a computer and executed by the computer, have the effect that the computer implements a method according to claim 1.

24. A method for producing a spectacle lens, comprising:
calculating or optimizing a spectacle lens using a method according to claim 1; and
providing manufacturing data of the spectacle lens calculated or optimized in such a way, and/or producing the spectacle lens calculated or optimized in such a way.

25. A device for producing a spectacle lens, comprising:
a calculator or optimizer designed to calculate or optimize the spectacle lens using a method according to claim 1; and
a finisher designed to finish the spectacle lens.

26. A device for simulating an optical system by means of calculating a wavefront, wherein the optical system is a complex optical system whose effect exceeds a single refraction, a single propagation, or a single reflection, comprising:
a modeling module designed to provide at least one wavefront transfer function for the optical system, wherein the wavefront transfer function is designed to assign an associated emergent wavefront to every wavefront entering into the optical system, under consideration of imaging errors with an order greater than the order of defocus; and
an evaluation module designed to evaluate the at least one wavefront transfer function for at least one wavefront entering into the optical system.

\* \* \* \* \*